United States Patent
Ong et al.

(10) Patent No.: US 12,369,102 B2
(45) Date of Patent: Jul. 22, 2025

(54) SSID BROADCAST MANAGEMENT TO SUPPORT PRIORITY OF BROADCAST

(71) Applicant: Comcast Cable Communications, LLC, Philadelphia, PA (US)

(72) Inventors: Ivan Ong, Malvern, PA (US); Phillip A. Sanderson, Mount Laurel, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/305,938

(22) Filed: Apr. 24, 2023

(65) Prior Publication Data

US 2024/0031919 A1     Jan. 25, 2024

Related U.S. Application Data

(63) Continuation of application No. 15/046,945, filed on Feb. 18, 2016, now Pat. No. 11,696,216.

(51) Int. Cl.
*H04W 48/10*     (2009.01)
*H04W 48/12*     (2009.01)
*H04W 84/12*     (2009.01)

(52) U.S. Cl.
CPC .......... *H04W 48/10* (2013.01); *H04W 48/12* (2013.01); *H04W 84/12* (2013.01)

(58) Field of Classification Search
CPC ...... H04W 48/10; H04W 48/12; H04W 84/12
See application file for complete search history.

(56) References Cited

U.S. PATENT DOCUMENTS

| | | | |
|---|---|---|---|
| 4,984,290 A | 1/1991 | Levine et al. |
| 6,223,043 B1 | 4/2001 | Hazama et al. |
| 6,522,881 B1 | 2/2003 | Feder et al. |
| 6,965,781 B1 | 11/2005 | Lewis et al. |
| 7,826,847 B1 | 11/2010 | Roskowski et al. |
| 8,335,507 B1 | 12/2012 | Mangal et al. |

(Continued)

FOREIGN PATENT DOCUMENTS

| | | |
|---|---|---|
| EP | 2421331 A1 | 2/2012 |
| EP | 2498549 A1 | 9/2012 |

(Continued)

OTHER PUBLICATIONS

May 18, 2016—Ivan Ong, "WiFi Optimizations to Improve SSID Priority to Enhance Overall Quality of Experience", NCTA 2016, Spring Tech Forum, XPO55366358.

(Continued)

*Primary Examiner* — Noel R Beharry
*Assistant Examiner* — Wilfred Thomas
(74) *Attorney, Agent, or Firm* — Banner & Witcoff, Ltd.

(57) ABSTRACT

Systems, methods, or apparatus may comprise a computing device to transmit a first plurality of beacon frames, where each beacon frame includes a first network identifier, and a second plurality of beacon frames, where each beacon frame includes a different second network identifier. Further, the computing device may also cause the wireless transceiver to transmit the first plurality of beacon frames using a transmission parameter, and transmit the second plurality of beacon frames using a different transmission parameter—that differs from the transmission parameter of the first plurality of beacon frames.

17 Claims, 11 Drawing Sheets

(56) References Cited

U.S. PATENT DOCUMENTS

| | | |
|---|---|---|
| 8,849,926 B2 | 9/2014 | Marzencki et al. |
| 8,996,031 B2 | 3/2015 | Austin et al. |
| 9,008,684 B2 | 4/2015 | Tipton et al. |
| 9,026,133 B2 | 5/2015 | Fix et al. |
| 9,043,879 B1 | 5/2015 | Reeves et al. |
| 9,066,202 B2 | 6/2015 | Dua et al. |
| 9,075,125 B2 | 7/2015 | Aldana et al. |
| 9,107,152 B1 | 8/2015 | Wurster |
| 9,319,840 B2 | 4/2016 | Porzio Giusto et al. |
| 9,549,319 B1 | 1/2017 | Butler et al. |
| 9,722,690 B2 | 8/2017 | Rappaport |
| 10,237,275 B2 * | 3/2019 | Huang ................ H04W 12/50 |
| 10,313,254 B1 * | 6/2019 | Suizo .................... H04L 67/02 |
| 10,371,789 B2 | 8/2019 | Takizawa et al. |
| 10,469,184 B1 | 11/2019 | Yu et al. |
| 10,588,165 B1 * | 3/2020 | Chu .................... H04B 7/0452 |
| 11,243,291 B2 | 2/2022 | Chae et al. |
| 11,330,558 B2 * | 5/2022 | Buckley ............... H04W 48/10 |
| 2002/0159395 A1 | 10/2002 | Nelson et al. |
| 2003/0163579 A1 | 8/2003 | Knauerhase et al. |
| 2003/0204748 A1 | 10/2003 | Chiu |
| 2004/0100936 A1 | 5/2004 | Liu |
| 2004/0103278 A1 | 5/2004 | Abhishek et al. |
| 2004/0145512 A1 | 7/2004 | Takano |
| 2004/0229621 A1 | 11/2004 | Misra |
| 2004/0236849 A1 | 11/2004 | Cooper |
| 2004/0242248 A1 | 12/2004 | Goldberg |
| 2004/0255001 A1 | 12/2004 | Oh |
| 2005/0053046 A1 | 3/2005 | Wang |
| 2005/0083227 A1 | 4/2005 | Takano |
| 2005/0130661 A1 | 6/2005 | Aerrabotu |
| 2006/0003763 A1 | 1/2006 | Almgren |
| 2006/0052100 A1 | 3/2006 | Almgren |
| 2006/0282541 A1 | 12/2006 | Hiroki |
| 2007/0014267 A1 | 1/2007 | Lam et al. |
| 2007/0047476 A1 | 3/2007 | Zhao et al. |
| 2007/0049323 A1 | 3/2007 | Wang et al. |
| 2007/0060125 A1 * | 3/2007 | Rahim ................ H04W 48/16 455/436 |
| 2007/0104138 A1 | 5/2007 | Rudolf et al. |
| 2007/0275701 A1 | 11/2007 | Jonker |
| 2008/0069065 A1 | 3/2008 | Wu et al. |
| 2008/0146223 A1 | 6/2008 | Welnick et al. |
| 2008/0198811 A1 | 8/2008 | Deshpande et al. |
| 2008/0261603 A1 | 10/2008 | Sever et al. |
| 2008/0304454 A1 | 12/2008 | Zhong et al. |
| 2009/0073937 A1 | 3/2009 | Xia et al. |
| 2009/0082014 A1 | 3/2009 | Kryszkiewicz et al. |
| 2009/0201842 A1 | 8/2009 | Guan et al. |
| 2009/0215452 A1 | 8/2009 | Balasubramanian et al. |
| 2009/0290520 A1 | 11/2009 | Roberts et al. |
| 2010/0020746 A1 | 1/2010 | Zaks |
| 2010/0167724 A1 | 7/2010 | Haran et al. |
| 2010/0267383 A1 | 10/2010 | Konstantinou et al. |
| 2010/0291922 A1 | 11/2010 | Lee et al. |
| 2011/0040870 A1 | 2/2011 | Wynn et al. |
| 2011/0206017 A1 | 8/2011 | Taghavi Nasrabadi et al. |
| 2011/0222518 A1 | 9/2011 | Ota et al. |
| 2012/0120913 A1 | 5/2012 | Wirtanen et al. |
| 2012/0230193 A1 | 9/2012 | Fang et al. |
| 2012/0230304 A1 | 9/2012 | Barbu et al. |
| 2012/0258709 A1 | 10/2012 | Swaminathan et al. |
| 2012/0284517 A1 | 11/2012 | Lambert et al. |
| 2013/0053014 A1 | 2/2013 | Sung |
| 2013/0102313 A1 | 4/2013 | Tinnakornsrisuphap et al. |
| 2013/0130678 A1 | 5/2013 | Zanier et al. |
| 2013/0273914 A1 | 10/2013 | Speks |
| 2013/0279381 A1 | 10/2013 | Sampath et al. |
| 2014/0003336 A1 | 1/2014 | Padden et al. |
| 2014/0068705 A1 | 3/2014 | Chambers et al. |
| 2014/0092731 A1 | 4/2014 | Gupta |
| 2014/0105037 A1 | 4/2014 | Manthiramoorthy |
| 2014/0215028 A1 * | 7/2014 | Donner .................. H04L 41/16 709/220 |
| 2014/0241226 A1 * | 8/2014 | Jia ......................... H04W 48/14 370/311 |
| 2014/0254581 A1 * | 9/2014 | Ogawara ............. H04L 61/5038 370/343 |
| 2014/0359738 A1 | 12/2014 | Nakajima |
| 2014/0369249 A1 * | 12/2014 | Mikhailov .............. H04W 4/06 370/312 |
| 2014/0370826 A1 * | 12/2014 | Amini .................. H04W 24/02 455/78 |
| 2014/0376537 A1 | 12/2014 | Manthiramoorthy |
| 2015/0063218 A1 | 3/2015 | Kotecha et al. |
| 2015/0119071 A1 | 4/2015 | Basha et al. |
| 2015/0121505 A1 * | 4/2015 | Coughlin ............. H04L 63/083 726/5 |
| 2015/0215832 A1 | 7/2015 | Fitzpatrick |
| 2015/0245278 A1 | 8/2015 | Scahill |
| 2015/0278867 A1 * | 10/2015 | Lerman ............... H04W 40/244 705/14.58 |
| 2015/0282058 A1 | 10/2015 | Forssell |
| 2015/0334548 A1 | 11/2015 | Liu et al. |
| 2015/0365815 A1 | 12/2015 | Säkkinen et al. |
| 2016/0192265 A1 | 6/2016 | Lim et al. |
| 2016/0205553 A1 | 7/2016 | Lee |
| 2016/0255604 A1 * | 9/2016 | Venkatraman ...... G01S 5/02524 455/456.1 |
| 2016/0302136 A1 | 10/2016 | Bergstrom et al. |
| 2016/0302144 A1 | 10/2016 | Kasslin et al. |
| 2016/0345253 A1 | 11/2016 | Bergstrom |
| 2016/0345334 A1 | 11/2016 | Veerepalli et al. |
| 2017/0034703 A1 * | 2/2017 | Dimatteo, III ........ H04W 12/04 |
| 2018/0070299 A1 | 3/2018 | Davies et al. |
| 2018/0227835 A1 * | 8/2018 | Martin ................. H04W 48/16 |
| 2018/0234985 A1 | 8/2018 | Filoche et al. |
| 2020/0029271 A1 | 1/2020 | Sood et al. |

FOREIGN PATENT DOCUMENTS

| | | |
|---|---|---|
| EP | 2753128 A2 | 7/2014 |
| EP | 3209064 A1 | 8/2017 |
| WO | 2007024346 A1 | 3/2007 |
| WO | 2007138530 A2 | 12/2007 |

OTHER PUBLICATIONS

May 4, 2017—(EP) Search Report—App No. 17156687.0.
Mar. 28, 2018—European Office Action—EP17156687.0.
Feb. 2, 2019—EP Summons to Oral Proceedings—17156687.0.
Dec. 6, 2019—European Partial Search Report—19188692.8.
Mar. 10, 2020—European Extended Search Report—EP 19188692.8.
Feb. 25, 2021—European Office Action—EP 19188692.8.

* cited by examiner

| 601 | 605 | 600 607 | 609 |
|---|---|---|---|
| | SSID | Broadcast Interval (ms) | Transmit Power Setting |
| 603 Wireless Transceiver | SSID 1 | 50 | 100 |
| | SSID 2 | 100 | 75 |
| | SSID 3 | 150 | 50 |
| | SSID 4 | 200 | 25 |

625

| 651 | 655 | 657 | 659 |
|---|---|---|---|
| | SSID | Broadcast Interval (ms) | Transmit Power Setting |
| 653 Wireless Transceiver | SSID 1 | 50 | 100 |
| | SSID 2 | 150 | 50 |
| | SSID 3 | 200 | 25 |
| | SSID 4 | 100 | 75 |

625

| | SSID | Broadcast Interval (ms) | Congestion |
|---|---|---|---|
| Wireless Transceiver | SSID 1 | 50 | High |
| | SSID 2 | 150 | Low |
| | SSID 3 | 100 | Medium |
| | SSID 4 | 200 | Medium High |

| | SSID | Broadcast Interval (ms) | Congestion |
|---|---|---|---|
| Wireless Transceiver | SSID 1 | 200 | High |
| | SSID 2 | 50 | Low |
| | SSID 3 | 100 | Medium |
| | SSID 4 | 150 | Medium High |

SSID BROADCAST MANAGEMENT TO SUPPORT PRIORITY OF BROADCAST

CROSS-REFERENCE TO RELATED APPLICATIONS

This application is a continuation of and claims priority to U.S. patent application Ser. No. 15/046,945, filed Feb. 18, 2016, which is hereby incorporated by reference in its entirety.

BACKGROUND

The promulgation of wireless technology has facilitated access to networks such as the Internet at virtually any location. A user device, such as a laptop, tablet, mobile phone, and other portable computing devices, may be provided with the capability of accessing the Internet through a variety of wireless networks, via Wi-Fi hotspots, wireless transceivers (WAP), and wireless local area networks (WLANs). Consequently, a user device may receive identifiers, such as service set identifiers (SSIDs), from multiple wireless networks which may be implemented by multiple wireless routers. Further, as the number of devices associating to wireless networks increases, more identifiers may be presented to a user in a particular location.

Some wireless routers offer multiple identifiers, e.g., for different wireless networks with different SSIDs. Wireless devices may connect to the different SSIDs for different purposes. There remains an ever-present need, however, to effectively manage and prioritize these multiple profiles offered by a router, or a group of routers, to better manage connections between user devices and different identifiers, and their associated networks. These and other shortcomings are identified and addressed in this disclosure.

BRIEF SUMMARY

In accordance with one aspect of the disclosure, systems and methods are provided for a wireless device that may provide two or more network-associated identifiers (network identifiers), such as SSIDs, and may prioritize the network-associated identifiers based on certain parameters. For example, if a user device is located in an outdoor environment serviced by several Wi-Fi hotspots and other network access points (AP), it may be preferable to cause the user device to associate to one identifier versus another, such as to a secure SSID instead of an open or public SSID. As another example, if a user walks into a neighbor's house that offers pay-for-access type access points, which the user is entitled to access, it would be preferable to cause a user device associated with the user to associate to that particular access point or one of those access points. The disclosed systems and methods, in some aspects, may be implemented without directly controlling user devices, knowing the settings of their network connection managers, or involving service providers. For example, preferred network-associated identifiers, such as SSIDs, may be emphasized so as to be more likely to be found, accessed and/or selected by a user or associated user device. In one aspect, a preferred identifier such as SSID may be emphasized by broadcasting and/or transmitting the SSIDs at a higher rate and/or transmission power.

Other aspects of the disclosure include a system, method, or apparatus that comprises a computing device that may cause a wireless transceiver to transmit a first plurality of beacon frames. Each beacon frame of the first plurality may comprise a first network identifier, such as a first service set identifier (SSID). The computing device may also cause the wireless transceiver to transmit a second plurality of beacon frames. Each beacon frame of the second plurality may comprise a second network identifier, such as a second SSID that is different from the first SSID. Further, the computing device may also cause the wireless transceiver to transmit the first plurality of beacon frames using a transmission parameter, and transmit the second plurality of beacon frames using a different transmission parameter.

For example, a wireless device may provide both public wireless network access and private wireless network access, using different network identifiers, in a user's premise such as a home. Although the different wireless networks may share some of the same hardware and software, they may provide access to different services and may be individually controlled by adjusting, among other characteristics or metrics, their broadcast interval and/or transmit power. A particular network and identifier maybe emphasized. For example, a shorter broadcast interval may translate to a higher rate of beacon management frames advertising a network-associated identifier, such as an SSID, making it more likely that a user device will attempt to connect to that SSID. A longer broadcast interval may translate to a delay in association, thereby, decreasing the probability of a user device connecting to that SSID. In some aspects, this may help to ensure the best quality of experience to a user. This is particularly true in situations where certain network-associated identifiers, such as SSIDs, may be more favorable depending on the environment in which the user is currently located.

This summary is not intended to identify critical or essential features of the disclosures herein, but instead merely summarizes certain features and variations thereof. Other details and features are described in the sections that follow.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicated similar elements.

DETAILED DESCRIPTION

Figure 1:
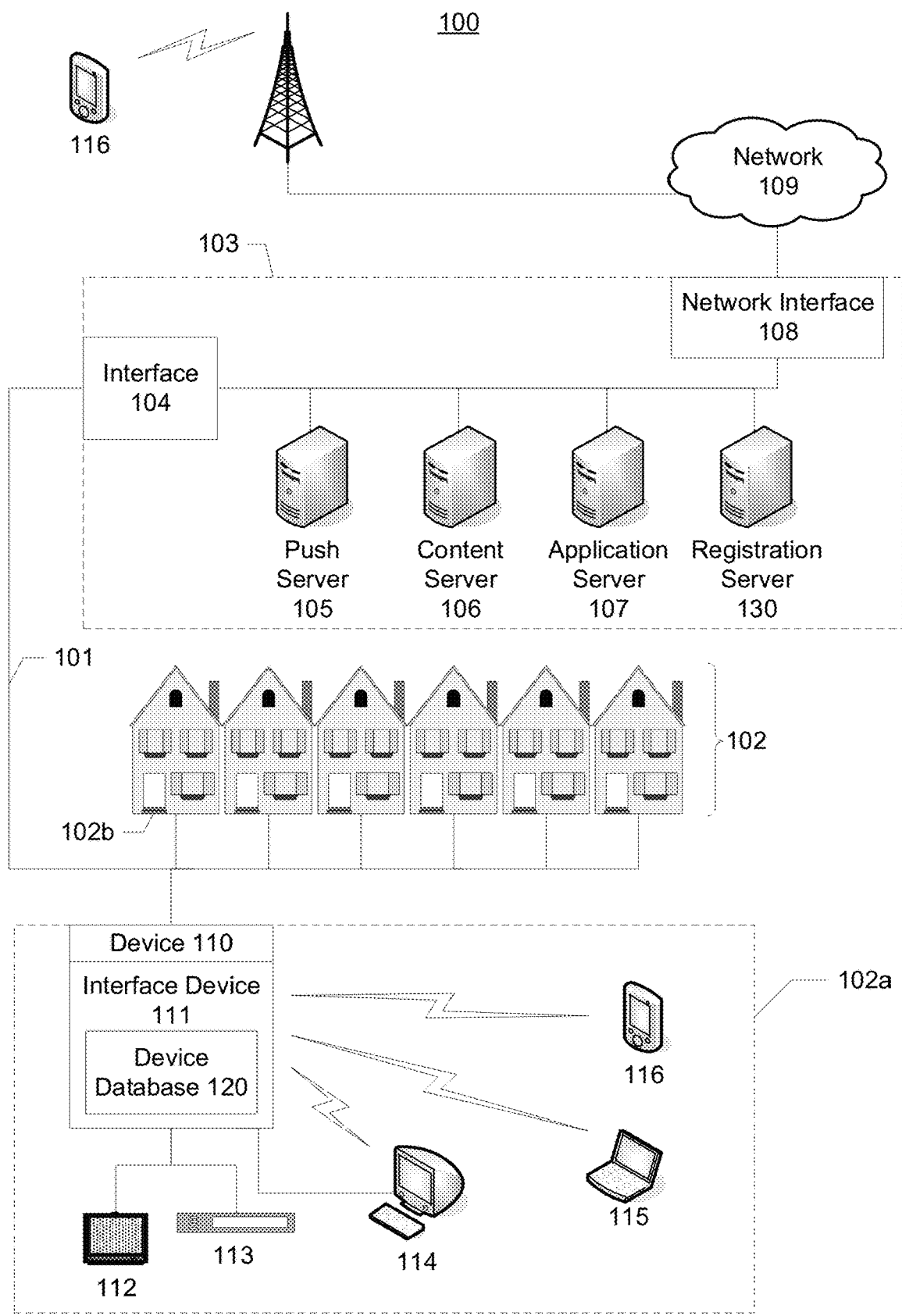
FIG. 1 illustrates an example network environment in accordance with aspects of the present disclosure.

FIG. 1 illustrates an example system 100 in which many of the various features described herein may be implemented. The illustrated system 100 is only one example of a suitable network environment and is not intended to suggest any limitation as to the scope of use or functionality of the disclosure. The illustrated network environment should not be interpreted as having any dependency or requirement relating to any component or combination of components in an information distribution environment.

System 100 may comprise a wireless network, an optical fiber network, a coaxial cable network, a hybrid fiber/coax (HFC) distribution network, or any other type of information distribution network or combination of networks. For example, system 100 may be a coaxial system comprising a cable modem termination system (CMTS) communicating with numerous gateway interface devices (e.g., gateway interface device 111 in example premises 102a). In another example, the system 100 may be a fiber optic service system comprising optical fibers extending from an optical line terminal (OLT) to numerous optical network terminals (ONTs) communicatively coupled with various gateway interface devices. In another example, the system 100 may be a digital subscriber line (DSL) system that includes local office 103 communicating with numerous gateway interface devices. In another example, system 100 may be a hybrid fiber coax (HFC) where Internet traffic is routed over both optical and coaxial communication paths to a gateway interface device in or near a user's home. Various aspects of the disclosure may operate on one or more of the aforementioned networks or any other suitable network architectures, now known or future developed.

System 100 may use a series of interconnected communication links 101 (e.g., coaxial cables, optical fibers, wireless links, etc.) to connect premises 102 (e.g., a home) or other user environments to local office 103. Communication links 101 may include any suitable wired communication paths, wireless communications paths, communications networks, or combinations thereof. For example, portions of communication links 101 may be implemented with fiber-optic cable, while other portions of communication links 101 may be implemented with coaxial cable. Communication links 101 may also include various communications components such as splitters, filters, amplifiers, wireless components, and other suitable components for communicating data.

Local office 103 may transmit downstream information signals onto communication links 101, and each of premises 102 may receive and process those signals. In certain implementations, communication links 101 originate from local office 103 as a single communications path, and may be split into any suitable number of communication paths to distribute data to premises 102 and various other destinations. Although the term "premise" is used by way of example, premises 102 may include any type of user environment or premises, such as single family homes, apartment complexes, businesses, schools, hospitals, parks, and other suitable environments or combinations of environments or outdoor environments.

Local office 103 may include interface 104, which may be a computing device configured to manage communications between devices on the network of communication links 101 and backend devices, such as server 105, server 106, server 107, and server 130. For example, interface 104 may be a cable modem termination system (CMTS). The termination system (TS) may be as specified in a standard, such as, in an example of an HFC-type network, the Data Over Cable Service Interface Specification (DOCSIS) standard, published by Cable Television Laboratories, Inc. The TS may be configured to transmit data over one or more downstream channels or frequencies to be received by various devices, such as modems in premises 102, and to receive upstream communications from those modems on one or more upstream frequencies.

Local office 103 may include one or more network interfaces 108 for communicating with one or more external networks 109. One or more external networks 109 may include, for example, one or more Internet Protocol networks, telephone networks, cellular telephone networks, fiber optic networks, local wireless networks (e.g., Wi-Fi, WiMAX), satellite networks, and any other network or combination of networks. One or more network interfaces 108 may include the corresponding circuitry needed to communicate with one or more external networks 109, and with devices accessible through one or more external networks 109. For example, one or more external networks 109 may communicate with one or more content sources, such as multicast or unicast video sources, which may supply video streams for ultimate consumption by various user devices in premises 102. User devices may include, but are not limited to, personal computers (PCs), server computers, hand-held or laptop computing devices, tablet computing devices, netbook computers, multiprocessor systems, microprocessor-based systems, set-top boxes (STBs), programmable consumer electronics, mobile or cellular phones, smart phones, media player devices, entertainment devices, household appliances (e.g., networked washing machines, refrigerators, light switches, etc.), robotic devices, security monitoring devices, medical monitoring devices, electronic apparel, game consoles, and any other suitable device or combination of devices.

Interface device 111 may include, or be communicatively coupled to, a wireless communications component (e.g., a wireless device) for wirelessly receiving data from and wirelessly transmitting data to user devices (client/consumer devices) such as television 112, set-top box 113, personal computer 114, laptop computer 115, and mobile device 116 (e.g., wireless laptop, netbook, tablet computer, mobile television, portable gaming device, mobile phone, etc.), wireless transceiver (not shown), wireless router (not shown), as well as to other gateways and devices communicatively coupled to system 100. The wireless communications component may operate using conventional wireless technologies, such as Wi-Fi and WiMax. For example, the wireless communications component may use different physical layer technologies, broadcast and/or transmit on different channels, or provide different local area networks (LANs), wireless local area networks (WLANs), service set identifiers (SSIDs), or virtual local area networks (VLANs). In some aspects, a SSID may be an alphanumeric character unique identifier which may be attached to a header of packets which are transmitted over a WLAN. The SSID may act as a password that may allow a wireless device to connect to the WLAN architecture. Each individual SSID may differentiate one WLAN from another, so any device trying to connect to a specific WLAN must use a particular SSID. In some embodiments, using multiple SSIDs may allow one or more users to access one or more networks through an individual access point. A network manager may develop and assign different configurations for each SSID, altering the flexibility and efficiency of the network infrastructure.

Different network identifiers, such as SSIDs, may be associated with particular types of services, such as video, data, and voice, or with different types of signaling data content, or with different tiers of service, such as connection speeds.

In some embodiments, interface device 111 may include both a modem component and a wireless communications component. In some aspects, interface device 111 may be a router (not shown), or may communicate with a router (not shown). In some embodiments, interface device 111 may be a wireless transceiver (not shown), or may communicate with a wireless transceiver (not shown). Such a fully-integrated device may allow bi-directional data communication with local office 103 and user devices 112, 113, 114, 115, 116, and any other suitable device or network. In other embodiments, the modem component, the wireless communications component, or both may be located in devices separate or remote from interface device 111. For example, the modem component may be located outside a user's home in an optical network terminal (ONT), while the wireless communications component may be located with a wireless antenna in a different location in the user's home than interface device 111. In other embodiments, both the modem component and wireless communications component may be located outside the user's home, but still provide Internet access to the user's user devices. In certain implementations, a service provider may provide a modem component and various other components while a user may provide a wireless communications component.

In some embodiments, interface device 111 may serve as a wireless access point/wireless transceiver for providing various wireless networks to user devices. In some examples, interface device 111 may alternatively be a wireless router (not shown) or wireless transceiver (not shown) and provide an indirect communications path, such as a backhaul connection, to the Internet through local office 103. Interface device 111 may route different media formats (e.g., data, voice, video, etc.) and may support unicast, broadcast and/or transmit, multicast, or any other suitable traffic. In certain implementations, interface device 111 may include, or be communicatively coupled to, one or more antennas for transmitting and receiving wireless communications. For example, interface device 111 may include an omnidirectional antenna for broadcasting and/or transmitting in and receiving data from all horizontal directions within a wireless broadcasting range (e.g., 100 meters) of the antenna. In another example, interface device 111 may include a directional, high-gain antenna for preferentially broadcasting and/or transmitting in and receiving data from a particular direction within a wireless broadcasting range (e.g., 150 meters in a particular horizontal direction) of the antenna. In certain implementations, the wireless broadcasting range may vary with frequency band. For example, a wireless network broadcast and/or transmit in a 2.4 GHz frequency band may have a greater wireless broadcasting range than a wireless network broadcast and/or transmit in a 5 GHz frequency band.

In some embodiments, interface devices 111 in user premises 102 may provide wireless transceivers with overlapping ranges. For example, example premises 102a and example premises 102b may both include interface devices 111 that provide numerous public and private networks. As a result, a user device located in example premises 102a may be within range of both or multiple wireless transceivers provided by both of the interface devices 111 (e.g., wireless device 116 may be within range of the four wireless networks (not shown) collectively provided by the gateway located in premises 102a and the gateway located in premises 102b). These different wireless transceivers may be identified using service set identifiers (SSIDs). This embodiment will be discussed further with reference to FIG. 3.

In some embodiments, interface device 111 may provide different wired and wireless networks for the user devices in example premises 102a using different types of wireless components. For example, interface device 111 may provide a first wireless network and a second wireless network different from the first wireless network. A first user device (e.g., laptop 115 with wireless 802.11a/b/g/n capabilities) may connect to the first wireless network provided by interface device 111. Meanwhile, a second user device (e.g., wireless device 116) may connect to the second wireless network provided by interface device 111.

In some embodiments, interface device 111 may provide multiple public wireless networks and multiple private wireless networks within the same wireless broadcasting range. For example, a private network may provide services to the user's home user devices, while a different (e.g., public, second private) network may provide services for guests to the user's home or third-party subscribers of the service provider. In one example, interface device 111 may be a dual (or greater) band wireless router and provide a public wireless network on a 2.4 GHz frequency band and a private wireless network on a 5 GHz frequency band. In another example, interface device 111 may provide a first private wireless network maintained by local office 103 on a first frequency band and a second private wireless network maintained by a user in example premises 102a on a second frequency band different from the first frequency band. In another example, interface device 111 may provide any suitable number and combination of public and private wireless networks to any suitable category of the user using any suitable wireless communications technique. In another example, interface device 111 may provide the public and private wireless networks on the same frequency band or channel. In certain implementations, the public and private wireless networks may have different service level agreements (SLAs), which may result in different byte limits, allocated bandwidths, authentication/encryption processes, or any other suitable processes or parameters. In another example, interface device 111 may provide the public and private wireless networks by each wireless network being identified by a particular SSID.

A public wireless network may be a wireless network with less restrictive (e.g., as compared to a private wireless network) access for user devices within a wireless broadcasting range of interface device 111 or an antenna communicatively coupled to interface device 111. For example, interface device 111 may grant a request from a user device to connect to its public wireless network with little or no authentication requirements. In another example, interface device 111 may grant a request from a user device to connect to its public wireless network in accordance with authentication requirements established by local office 103 (e.g., corresponding to registration or subscription transmission characteristics for a service provider's wireless network). In certain implementations, a public wireless network may be a wireless network whose resources are reserved for the use of a service provider or the owner of local office 103. For example, a public wireless network may be implemented as a wireless hotspot through which wireless user devices may connect to the Internet. In some implementations, a group of overlapping hotspots (e.g., a wireless community network, a lily pad network) may allow user devices to stay continuously or semi-continuously connected to the Internet while moving from one location to another location.

A private wireless network may be a wireless network with restricted access to pre-authorized user devices, or a wireless network whose resources are reserved for the use of the owner of a home in which the wireless network resides. In another implementation, a private wireless network whose resources may be reserved for use by a user who has purchased or paid for wireless network access or the wireless network. Authorized user devices may include, for example, user devices belonging to the owner or lessee of interface device 111 and the owner's designated family members, friends, and invited guests. In another implementation, authorized user devices may include, for example, user devices belonging to a user who has purchased or paid for access to interface device 111. For example, interface device 111 may grant a request from a user device to connect to its private wireless network in accordance with the authentication requirements (e.g., username/password, pre-shared key, device filtering based on unique identifiers) of interface device 111. A private wireless network may be implemented as, for example, a private LAN in a user's home or LAN that the user has purchased or paid for.

In some embodiments, one or more of the wireless networks provided by interface device 111 may be configurable. For example, the public wireless network, private wireless network, or both may be dynamically configurable by a user or local office 103 to indicate the channel to communicate on, the network identifier to broadcast and/or transmit, whether or not the network identifier should be publicly broadcast and/or transmitted, or any other suitable information.

The wireless communications component of interface device 111 may wirelessly broadcast and/or transmit network identifiers, such as service set identifiers (SSIDs), for one or more of the wireless networks it provides. For example, interface device 111's wireless communications component may broadcast and/or transmit a public wireless network identifier (e.g., an SSID) to all user devices within wireless broadcasting range of interface device 111. In another example, the wireless communications component of interface device 111 may not broadcast and/or transmit network identifiers for one or both of the public and private wireless networks.

In some embodiments, interface device 111 may broadcast and/or transmit one or more network-associated identifiers, such as one or more SSIDs, each representing a public or private wireless network. For example, interface device 111 may be a router which broadcasts and/or transmits four SSIDs (e.g., SSID 1 through SSID 4). Each SSID can be broadcast and/or transmitted differently to increase the possibility of it being discovered or connected to by a user device. By influencing the broadcast characteristics of the SSIDs, the system results in a determinative priority arrangement of the SSIDs seen by the user device. In some embodiments, the user device may list the SSIDs in a particular priority ordering. In some embodiments, the user device may list the SSIDs in a particular priority ordering based on the strength of the signal of each SSID. Example information that may detail how the interface device 111 may broadcast and/or transmit the SSIDs will be discussed beginning with FIG. 3.

Interface device 111 may encrypt communications to and from a user device using any suitable technique. For example, data communicated over the public wireless network, private wireless network, or both may be encrypted using TKIP, AES, CCMP, or any other suitable cryptographic technique. In certain implementations, interface device 111 may encrypt data differently for different wireless networks. For example, interface device 111 may encrypt data transmissions on a private network using a higher (e.g., more secure) level of encryption than the level of encryption for data transmissions on a public network. In some examples, a public network may refer to an unsecured network or secured network.

Interface device 111 may simultaneously or near-simultaneously communicate with public user devices on a public wireless network and home user devices on a private wireless network. In certain implementations, interface device 111 may compartmentalize data communications over a public network and a private network such that data communicated on the private network cannot be accessed by user devices on the public network. For example, interface device 111 may implement a firewall or other security techniques to differentiate the public user device's traffic and the home user device's traffic (e.g., using VLAN technology). This compartmentalization feature allows for increased security because home user devices on the private wireless network are protected from potentially malicious public user devices on the public wireless network. In some examples, a private network may refer to an unsecured network or secured network.

When multiple wireless networks are available to a user device, interface device 111, local office 103, or both may transmit a configuration file or parameter setting that varies the transmission characteristics of various SSIDs. For example, interface device 111 may broadcast and/or transmit a private wireless network SSID more frequently than a public wireless network SSID causing the private wireless network SSID to appear listed before the public wireless network. In another example, the user may set up transmission characteristics that govern how the different wireless networks are broadcast and/or transmitted in order to effect the priority of how the user device connects and the wireless networks and how the SSIDs may be transmitted the user device and how the user device may display a listing of the SSIDs to the user.

Figure 2:
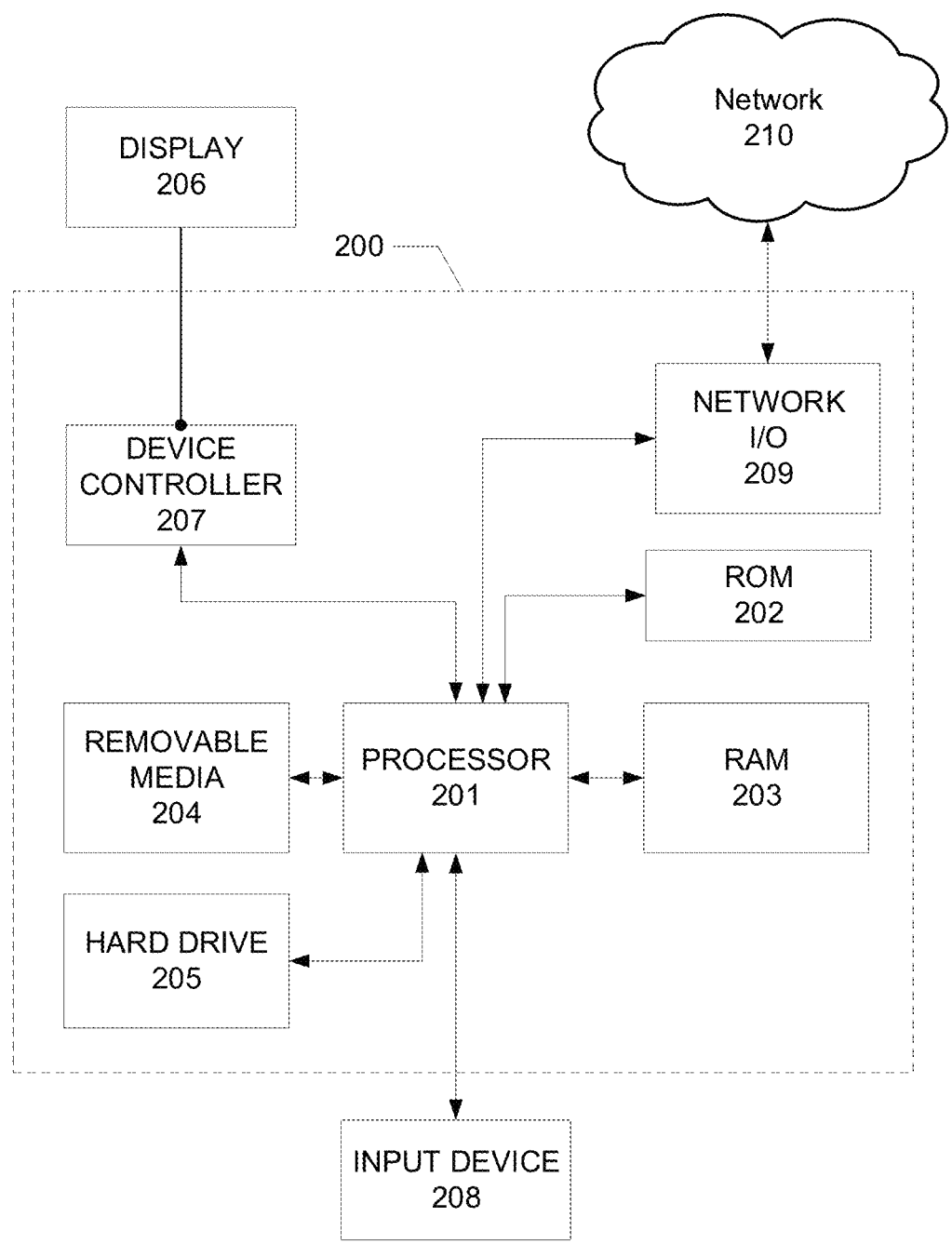
FIG. 2 illustrates an example computing system in accordance with aspects of the present disclosure.

FIG. 2 illustrates general hardware elements that can be used to implement any of the various computing devices described herein. Device 200 may include one or more processors 201, which may execute instructions of a computer program to perform any of the features described herein. The instructions may be stored in any type of computer-readable medium or memory to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), hard drive, or any other desired electronic storage medium. Instructions may also be stored in hard drive 205, which may be an internal or external hard drive.

Device 200 may include a variety of computer-readable media. Computer-readable media may be any available media that may be accessed by device 200 and include both volatile and non-volatile media as well as removable and non-removable media. For example, computer-readable media may comprise a combination of computer storage media and communication media.

Computer storage media may include volatile and non-volatile as well as removable and non-removable media. Computer storage media may be implemented in any method or technology for storage of information such as computer-readable instructions, data structures, program modules, or other data. Computer storage media include, but are not limited to, random access memory (RAM), read only memory (ROM), electronically erasable programmable read only memory (EEPROM), flash memory or other memory technology, or any other medium that can be used to store desired information that can be accessed by device 200.

In some embodiments, device 200 may include one or more output devices, such as a display 206 (e.g., an external monitor or television) and may include one or more output device controllers 207, such as a video processor. In some embodiments, device 200 may include one or more user input devices 208, such as a remote control, keyboard, mouse, touch screen, microphone, or any other suitable input device.

In some embodiments, device 200 may include one or more network interfaces, such as input/output (I/O) interface 209 (e.g., a network card), for communicating with external network 210. Interface 209 may be a wired interface, a wireless interface, or both. In certain implementations, interface 209 may include a modem (e.g., a cable modem), and network 210 may include communication links 101 shown in FIG. 1, one or more external networks 109, an in-home network, a provider's wireless, coaxial, fiber, or hybrid fiber/coaxial distribution system (e.g., a DOCSIS network), or any other desired network.

RAM 203 may include one or more applications representing the application data stored in RAM 203 while the device 200 is on and corresponding software applications (e.g., software tasks) are running on the device 200.

Figure 3:
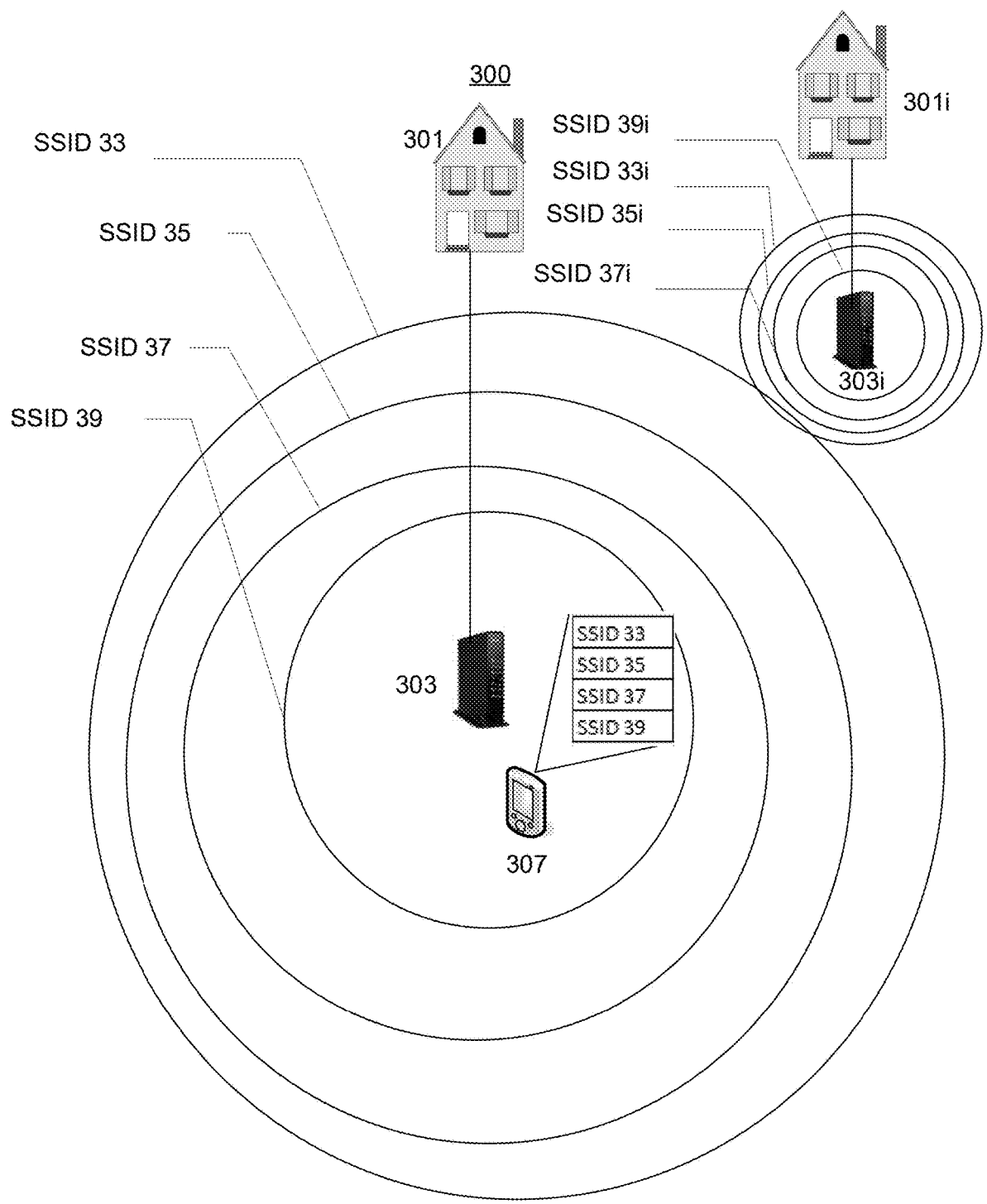
FIG. 3 illustrates an example network environment in accordance with aspects of the present disclosure.

FIG. 3 illustrates an example wireless network environment 300 which includes premises 301 which may contain a gateway interface/wireless device (e.g., a router 303). In some embodiments, premises 301 may be the same as premises 102 or 102b, as seen in FIG. 1. In some embodiments, premises 301 may be an apartment, a business, a home, a house, a townhouse, a condo, a living space, or an indoor or outdoor environment. The router 303 may generate one or more network identifiers, such as service set identifiers (SSIDs), for connecting to one or more networks such as public or private networks. The one or more networks may be administered or associated with different network providers. In the example embodiment shown in FIG. 3, the router 303 broadcasts and/or transmits one or more network-associated identifiers, for example, four SSIDs. The concentric rings extending from the router 303 may represent the strength of the broadcast signal of each SSID. The larger the ring, the higher the priority level or the stronger the broadcast signal of the SSID. In some aspects, the concentric rings extending from the router 303 may represent the desired priority of the SSIDs for being connected to by a mobile device 307.

Mobile device 307 may display a listing of the SSIDs in an order based on the priority that the SSIDs are transmitted from router 303. In the example shown in FIG. 3, mobile device 307 may display SSID 33 with the highest priority followed by SSID 35, SSID 37, and lastly SSID 39 (having the lowest priority). In some embodiments (not shown), the router 303 may broadcast the SSIDs in a different priority as follows: SSID 35 (highest priority), SSID 39, SSID 37, and SSID 33 (lowest priority). Under this embodiment, as a result of the broadcast and/or transmission by router 303, mobile device 307 may display the SSIDs in the following order: SSID 35, SSID 39, SSID 37 and SSID 33. In some instances, router 303 may broadcast the SSIDs in any priority arrangement and mobile device 307 may identify and display the SSIDs to a user in an order based on the broadcast and/or transmission. For example, a SSID with a higher priority may be broadcast and/or transmitted more frequently and/or at a higher power than a SSID at a lower priority. In this manner, the likelihood of the SSID at the higher priority being connected to by the mobile device may be increased. The protocols described herein may operate with a mobile device that is unaltered. For example, using commonly available protocol stacks the mobile devices may place the SSIDs with the higher priority first in the list of available SSIDs, because they may be broadcast and/or transmitted at a higher frequency and/or at a higher power. In other embodiments, the protocol stack in the mobile device may be altered to analyze the SSIDs to determine which SSIDs have greater capacity, better QoS, and/or more advanced capabilities/protocols as more fully described below.

Router 303 may broadcast and/or transmit each SSID differently by adjusting characteristics of the chipset or the parameter settings (e.g. configuration). Adjusting these characteristics may be accomplished by having router 303 increase or decrease the beacon broadcast frequency (e.g., broadcast interval) or the transmission parameter (e.g., broadcast power, transmit power, transmission power setting, etc.) of each SSID. In some examples, adjusting these characteristics may correlate to beacon frames being transmitted at a higher or lower antenna transmit power or adjusting the transmission rate of the beacon frames. The transmission rate may refer the speed (e.g., how fast or how often) at which beacon frames are being transmitted or broadcast. In some aspects, the broadcast interval may comprise beacon frames including one or more service set identifiers (SSIDs). For example, router 303 may establish a first set of transmission parameters for SSID 35 and establish a different set of transmission parameters for SSID 37 causing the router 303 to broadcast and/or transmit SSID 35 more frequently and, for example, at a higher power than SSID 37.

In the embodiment illustrated in FIG. 3, the transmission parameter (e.g., chipset transmission characteristics) of SSID 33 may be set to a higher transmission power setting than the other SSIDs (e.g., SSID 35, SSID 37, and SSID 39), and/or the broadcast interval of SSID 33 may be set to a shorter broadcast interval than the other SSIDs (e.g., SSID 35, SSID 37, and SSID 39). For example, SSID 33 may have a transmission power setting of 100, while SSID 35, SSID 37, and SSID 39 may respectively have a transmission power setting of 75, 50, and/or 25. In other examples, SSID 33 may have a broadcast interval of while SSID 35, SSID 37, and SSID 39 may respectively have a broadcast interval of 75 ms, 100 ms, and/or 200 ms. In some embodiments, the SSID characteristics may be adjusted using a combination of the broadcast interval and the broadcast power. In other embodiments, the priority may be set by broadcasting and/or transmitting the highest priority SSID(s) at a higher rate than the rate at which the SSIDs are broadcast and/or transmitted. For example, the highest priority SSID(s) may be broadcast and/or transmitted at 1.5 times, 2 times, 3 times, 4 times, or 5 or more times the rate at which SSIDs of a lower priority are broadcast and/or transmitted.

In some embodiments, the wireless networks operated by router 303 may be identified by individualized SSIDs that may be broadcast and/or transmitted in an overlapping range. In some embodiments, as illustrated in FIG. 3, a first router 303 may broadcast and/or transmit different network identifiers (e.g., SSID 33, SSID 35, SSID 37, and SSID 39) that overlap with different wireless networks (e.g., SSID 33i, SSID 35i, SSID 37i, and SSID 39i) which are broadcast and/or transmitted by a second router 303i. In some embodiments, the second router 303i may be located in (or on) a different premises 301i. In some embodiments (not shown), the second router 303i may be located on the same premises 301 as the first router 303. In some embodiments, there may be multiple premises 301 and multiple routers 303 and they may comprise numerous combinations of premises to router relationships, which can span multiple routers in one premises and additional routers in other premises. By adjusting the priority of the SSIDs among different routers and different premises, the network may manage additional connections to direct those connections to physical access points (e.g., wired access points) with less bandwidth constraints. In other words, management of the priority of the SSIDs may allow the system to reroute connections to areas where there is existing excess capacity, and thus, provide a better overall experience for the wireless user by load balancing among different access points.

Further, some routers may have more advanced capabilities such as beamforming, MIMO, MU MIMO, and coordinated multipoint. Routers with advanced capabilities may be able to handle the traffic at a higher bandwidth and less interference. The SSID priority can be utilized to direct traffic to the router with the ability to deliver the best user experience in terms of Quality of Service (QoS) and bandwidth, which in some cases may be the wireless device having the most advanced capabilities even though that wireless device may have a higher data load. For example, routers 303 and/or 303i (e.g., wireless access points or wireless routers) may have different capabilities such as router 303i having MIMO, beamforming, and ComP capabilities. Router 303i may also be configured with a higher wired bandwidth connection to the internet. Thus, even though router 303 may have less data passing through the router, it may still be desirable to prioritize SSIDs coming from router 303i to provide the best user experience, because router 303i may have additional wireless and/or wired capabilities rendering a better overall user experience for the mobile access device.

The overall network control for load balancing may be distributed to each of the access points, CMTSs, nodes, and/or routers as a distributed network management system and/or the network control may be centrally located in a network management system located in the central office 103. The network management system may contain a dynamically updated database including the current load (e.g., streaming flows, data flows, upstream/downstream metrics including bandwidth and other measurements such as QoS) for each access point and SSIDs associated with that access point, and prioritize the various SSIDs of different access points and/or SSIDs at one access point to direct mobile devices to access points and/or associated SSIDs which may provide the best user experience. Additionally, the SSIDs themselves may be configured so that the user can determine which SSID offers the highest speed and the most advanced capabilities.

For example, the SSIDs may have a naming convention indicative of the currently available maximum speed of the access point such as, for example, SSID 2 Ghz, SSID 150 Mhz, SSID 50 Mhz. For example, some routers may be directly connected to an optical fiber network and/or may be configured to have a much higher throughput. Other routers or access points may employ a more advanced protocol (e.g., carrier aggregation, beamforming, coordinated multi-point, and/or MIMO). Some routers or access points may have more than one protocol, e.g., 802.11 ac and LTEA device-to-device (e.g., LTE Direct) communication protocols. The SSID may indicate (e.g., advertise) any number of properties, and SSIDs may be prioritized at devices having more advanced properties (e.g., higher speeds, less loading, greater capabilities (such as carrier aggregation, beamforming, coordinated multi-point, MIMO, more supported access point protocols such as LTEA device-to-device features/LTE Direct)). In these embodiments, the SSIDs may be broadcast and/or transmitted in such a fashion to encourage connection to the SSID with the most advanced capabilities and/or the most available bandwidth. Further, the priority of the SSIDs may vary dynamically based on loading. For example, in some embodiments where one SSID becomes overloaded with connections (e.g., a group of individuals streaming 4K video), the network management system may detect the loading and redirect the access points in the immediate vicinity to alter the SSID's broadcast characteristics. This may dynamically alter the priorities of the various access point SSIDs to enable another access point that may be not as heavily loaded or with more available bandwidth to have a higher priority.

Figure 4:
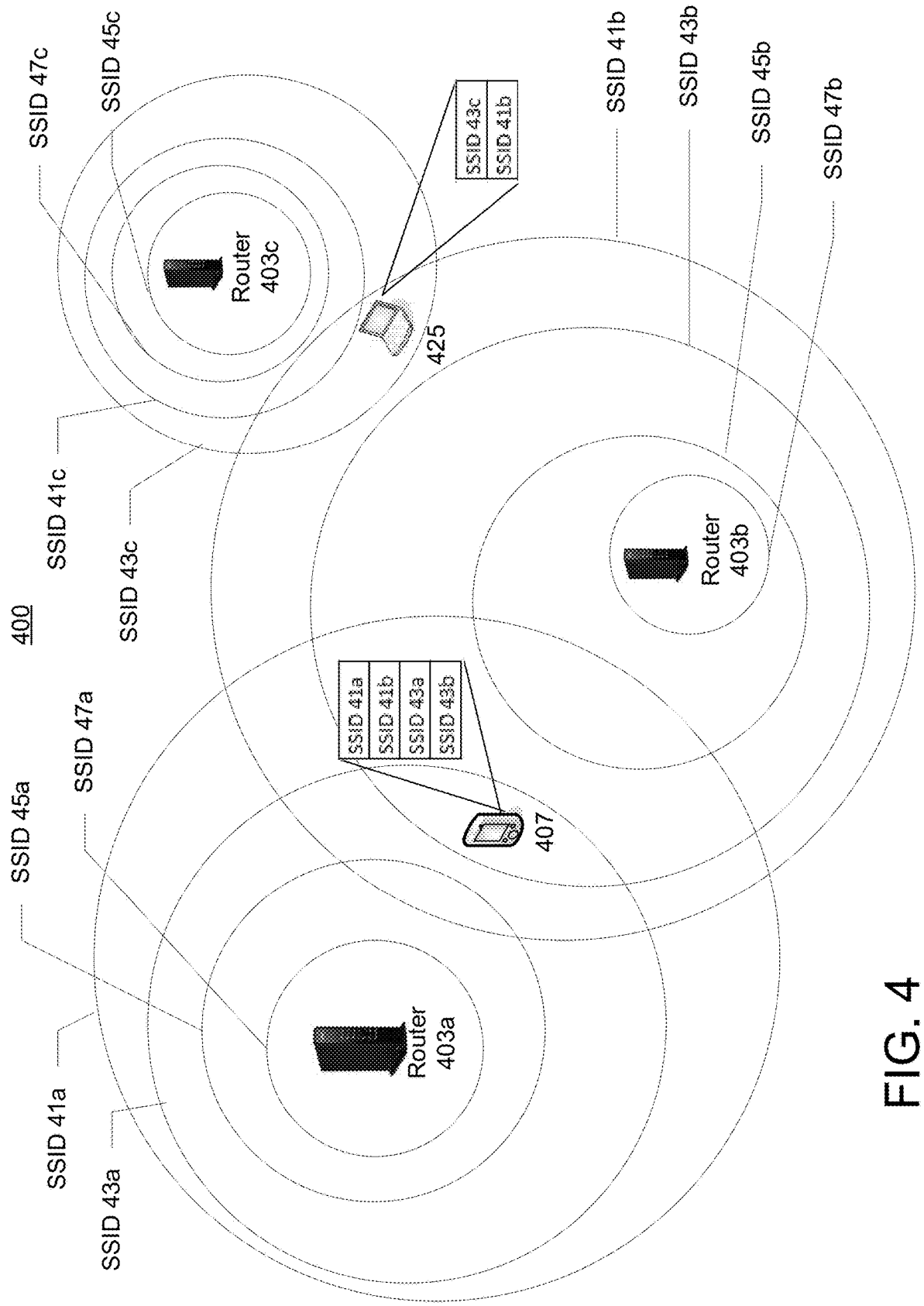
FIG. 4 illustrates another example network environment in accordance with aspects of the present disclosure.

FIG. 4 illustrates an example wireless network environment 400, which may include multiple routers. In this example, network environment 400 may include three routers (e.g., router 403a, router 403b, and router 403c). Under this embodiment, each router may broadcast one or more network-associated identifiers, for example, four SSIDs. In some embodiments, some routers may broadcast and/or transmit one or more network-associated identifiers, such as SSIDs. In some aspects, the SSIDs may consist of a mixture of public and private access wireless networks. In some embodiments, any combination of overlapping, not overlapping, public access, and private access wireless networks may be broadcast and/or transmitted.

In some variations, routers 403 may be the same as previously described routers 303. In the example embodiment shown in FIG. 4, a mobile device 407 (which may be the same as previously described mobile device 307) may receive SSID broadcast information from routers 403a through 403c. Mobile device 407 may display a priority listing of the available wireless networks (within its range), based on the broadcast characteristics of each of the SSIDs (e.g. SSID 41a, SSID 43a, SSID 41b, and SSID 43b). In some embodiments, the priority listing or wireless network recognition by mobile device 407 may change based on different broadcast characteristics of each router (e.g. 403a and 403b) and/or each SSID (e.g. SSID 41a, SSID 43a, SSID 41b, and SSID 43b), within the mobile device's 407 range. In some examples, the priority listing displayed by the mobile device 407 may change depending on the location of the mobile device 407, and the mobile device's 407 location relative to the various routers (e.g., 403a, 403b, and 403c) and/or dynamically depending on the currently unused capabilities and/or currently unused bandwidth of each router.

FIG. 4 also illustrates a computing device 425 (e.g., which may be any of the previously described user devices). In some embodiments, the devices 407 and 425 may display different priority lists of the SSIDs from each other. In some examples, the list each user device 407 and 425 displays may depend on the location of each individual user device 407 and 425 relative to each router (e.g., 403a, 403b, and 403c). For example, as seen in FIG. 4, mobile device 407 is in a different location than computing device 425; therefore, each user device may display a different priority listing of the SSIDs from each other. Under this example, mobile device 407 may display the listing of the SSIDs in the following order: SSID 41a, 41b, 43a, and then 43b; while computing device 425 may display the listing of the SSIDs in the following order: 43c and then 41b. In other embodiments where the mobile device has an access point aware protocol stack, the mobile device may take into consideration the capabilities of the access points and/or the individual mobile device. For example, a mobile device that has additional connection capabilities (e.g., LTE device-to-device in addition to Wi-Fi) may prioritize SSIDs with greater capabilities and overall bandwidth higher than other access points.

In some variations, each router 403a, 403b, 403c may be configured using the same set of transmission characteristics or instructions for broadcasting and/or transmitting their SSIDs. For example, each router 403a, 403b, and 403c may be configured to transmit all SSIDs representing paid-for service at a higher priority than SSIDs representing free service. In some aspects, each router 403a, 403b, and 403c may be configured using different transmission characteristics or instructions for broadcasting their SSIDs. For example, router 403a may be configured to broadcast and/or transmit its SSIDs based on which SSIDs represent paid-for or free service (which may represent higher bandwidth access points), router 403b may be configured to broadcast and/or transmit its SSIDs based on the congestion level of its SSIDs, and router 403c may be configured to broadcast and/or transmit its SSIDs based on user instructions, where the user instructions may be based on the user's preferences.

Figure 5A:
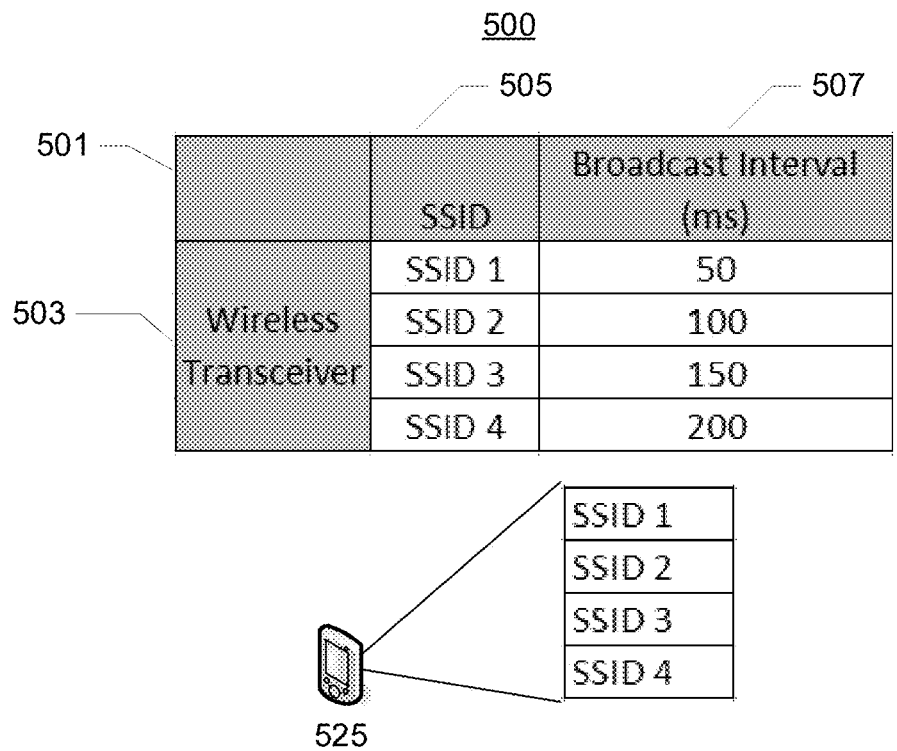
FIGS. 5a and 5b illustrate example information in accordance with aspects of the present disclosure.

FIG. 5a illustrates a table 501 containing transmission characteristics for controlling or operating a computing device such as a wireless transceiver 503 (e.g., a wireless device, router, wireless access point (access point), or the like) to set a network-associated identifier index, such as a SSID index, and/or broadcast characteristics. Such characteristics may be contained in software that can be stored or accessed by computing device. The network-associated identifier index and/or broadcast characteristics may be administered or associated with different network providers. In some aspects, the wireless transceiver may be configured to transmit/broadcast SSIDs in a particular priority based on information stored in table 501. In some aspects, the transmission characteristics may be downloaded via a configuration file or a parameter setting. In some embodiments, the transmission characteristics may be generated or determined by a content/service provider, a user, or a combination of both. In some examples, a wireless transceiver may be configured or initialized with a built-in set of transmission characteristics for prioritizing and transmitting the SSIDs. Further, the priorities may be static, semi-static, and/or dynamic based on various parameters such as loading and/or available bandwidth as discussed above.

There may be different variations on how the broadcast interval may be set for a particular SSID. For example, the SSID broadcast interval parameter (e.g., transmission parameter) may be set by the content delivery service and may be delivered downstream to the wireless transceiver from office 103. The service provider may determine how the SSIDs should be broadcast and/or transmitted, or the priority level of the SSIDs. In some examples, a user, client, or owner of the wireless transceiver may select from one or more predetermined options to adjust the priority (e.g. broadcast interval) of the SSIDs that may be broadcast and/or transmitted. Under another example, a user may be able to manually adjust or select the interval for each SSID by using a user interface to input an exact value. In another embodiment, the content delivery service, content delivery provider, or service provider may provide an initial configuration file containing a transmission parameter for the broadcast interval of each SSID. In some aspects, the client or user may be able to adjust the broadcast interval for each SSID after the initial configuration file has been implemented by creating a new configuration file or modifying the existing configuration file. In another embodiment, one or more of the network SSIDs may be set to the same broadcast interval, while another one or more network SSIDs may be set to a different broadcast interval. The priority of each SSID may be coordinated among different co-located access points in a static, semi-static, and/or dynamic fashion based on various factors such as available capabilities and/or available bandwidth in a manner such as discussed herein.

In some variations, a user or service provider may be able to set the broadcast interval and/or transmission power setting of each SSID based on the time of day. For example, a user may cause a wireless transceiver to use one configuration file for a morning time and use a different configuration file with different settings for afternoon and/or nighttime broadcast and/or transmission. For example, an access point may receive different loading at different times of day, and the priority of that access point may be lowered. For example, if an access point also services a home that starts streaming large amounts of 4K video at 6:00 pm each evening, the priority of that access point for people outside of the home (e.g., a pedestrian walking down the street) may be lowered so as to redirect loading to a different access point (e.g., a neighbor's house). A similar concept may apply to businesses and/or other access points. Each configuration file may contain different transmission parameter settings for the SSIDs that may be broadcast and/or transmitted by the wireless transceiver. In other examples, the wireless transceiver may download or receive different configuration files for transmitting the SSIDs based on the different days of the week (e.g., one configuration file for weekdays and a different configuration file for weekends). In some embodiments, the wireless transceiver may download or receive different configuration files for transmitting the SSIDs based on different times, (e.g., months, years, weeks, seasons, time of day, etc.). In some aspects, the wireless transceiver may download, receive, or enable different configuration files based on the number of devices connected to the wireless transceiver and/or the load being utilized by those devices.

Again referring to FIG. 5a, in another example, table 501 may show transmission characteristics for a wireless transceiver 503, which may enable the wireless transceiver 503 to broadcast and/or transmit one or more wireless networks identified by one or more unique network SSIDs 505 (e.g., SSID 1, SSID 2, SSID 3, and SSID 4). Under this example, each SSID 505 may be broadcast and/or transmitted at a different broadcast interval 507. For example, SSID 1 may be broadcast and/or transmitted at a broadcast interval 507 of 50 ms. In some embodiments, the shorter the broadcast interval 507 the more frequent a particular SSID (e.g., SSID 1 through SSID 4) may be broadcast and/or transmitted. In some embodiments, the broadcast interval 507 for each SSID may be determined based the location of the wireless transceiver 503 and its environment. For example, if the wireless transceiver 503 is located in a user's home, the broadcast interval 507 may be set, as seen in FIG. 5a, to broadcast and/or transmit the network SSIDs with a priority order of SSID 1 (highest), SSID 2, SSID 3, and SSID 4 (lowest). Under this example, mobile device 525 may display a priority of the SSIDs as shown: SSID 1 (highest), SSID 2, SSID 3, and then SSID 4 (lowest). In another example, the wireless transceiver 503 may be located in a park, and the broadcast interval 507 may be different for each SSID than shown in FIG. 5a. For example, the wireless transceiver 503 may be configured to transmit or broadcast SSIDs using the following broadcast intervals: SSID 1 @200 ms, SSID 2@145 ms, SSID 3@95 ms, and SSID 4@50 ms, which may result in mobile device 525 displaying the SSIDs in the following order: SSID 4 (highest), SSID 3, SSID 2, and then SSID 1 (lowest).

Figure 5B:
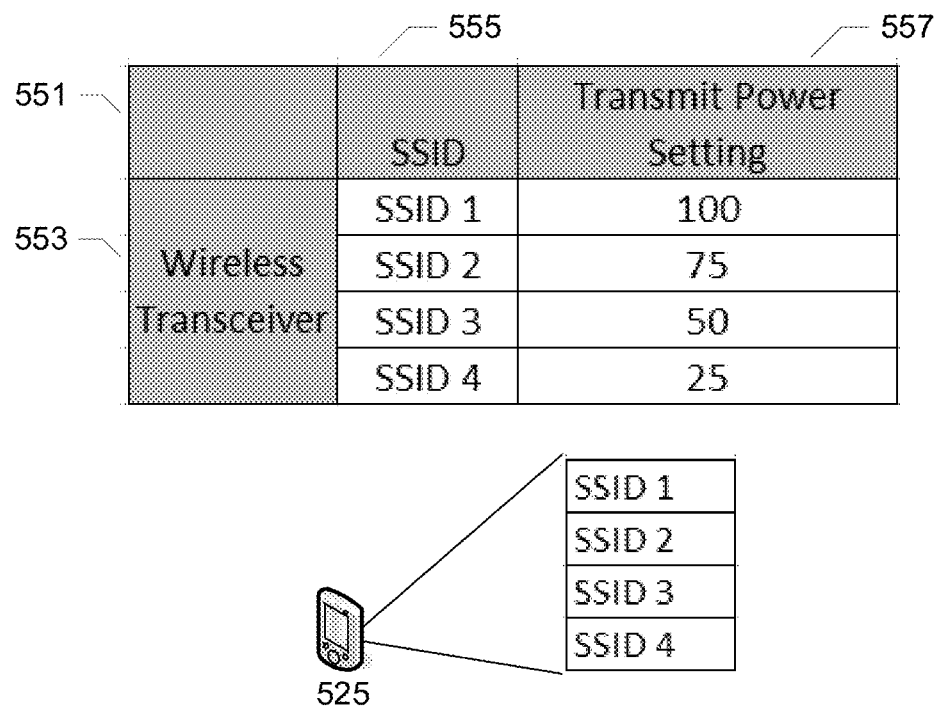

FIG. 5*b* illustrates a table 551 of transmission characteristics for controlling or operating a wireless transceiver 553. In this example, table 551 depicts transmission characteristics for a wireless transceiver 553, which may enable the wireless transceiver 553 to broadcast multiple SSIDs, with each SSID being broadcast and/or transmitted at a different transmission power setting 557. For example, SSID 1 may be broadcast and/or transmitted at a transmission power setting of 100. In some aspects, the higher the transmission power setting may mean the higher power at which a particular SSID may be broadcast and/or transmitted by the wireless transceiver 553. Further, an SSID being broadcast and/or transmitted at a higher transmission power setting (than the other SSIDs) may increase the likelihood that a mobile device automatically connects to that SSID (with the highest transmission power setting). As seen in the example embodiment of FIG. 5*b*, wireless transceiver 553 may be configured with the following transmission power settings: SSID 1@100, SSID 2@75, SSID 3@50, and SSID 4@25, which may result in mobile device 525 displaying the SSIDs 555 in the following order: SSID 1 (highest), SSID 2, SSID 3, and then SSID 4 (lowest).

Figure 6A:
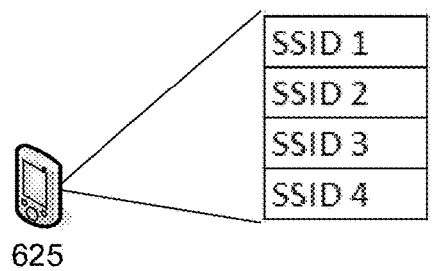
FIGS. 6a and 6b illustrate example information in accordance with aspects of the present disclosure.

FIG. 6*a* illustrates a table 601 of transmission characteristics for controlling or operating a wireless transceiver 603 for broadcasting and/or transmitting its network-associated identifiers, for example SSIDs 605 (e.g., SSID 1, SSID 2, SSID 3 and SSID 4). The network-associated identifiers may be administered or associated with different network providers, for example. The table 601 shows broadcast intervals 607, in milliseconds, at which each SSID may be broadcast and/or transmitted as well as the transmission power setting 609 of each SSID. For example, SSID 1 may be broadcast and/or transmitted at a broadcast interval of 50 ms and a transmission power setting of 100. As another example, as seen in FIG. 6*a*, SSID 1 may be the most likely to be selected (e.g., connected to by a device), because of the combination of broadcast interval 607 and transmission power setting 609. For example, the broadcast interval 607 may be set to the shortest interval compared to the other SSIDs, and the transmission power setting 609 may be set higher than the other SSIDs. As illustrated in FIG. 6*a*, based on the transmission characteristics displayed in the table 601, SSID 1 should have the greatest chance to be recognized and selected by a user device 625, as a potential wireless network to connect to.

Figure 6B:
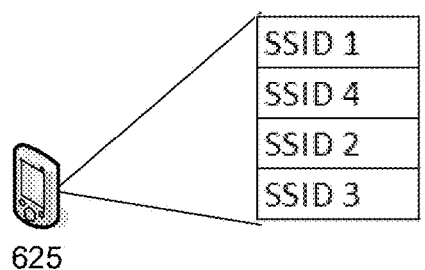

FIG. 6*b* illustrates a table 651 of transmission characteristics that are different from the transmission characteristics in FIG. 6*a*. The transmission characteristics may be used by a wireless transceiver 653 for first adjusting the broadcast interval 657 and then adjusting the transmission power setting 659. As shown in FIG. 6*b*, given the transmission characteristics, SSID 1 should have the highest probability of being selected. In some aspects, the transmission power setting 659 may be modified before the broadcast interval 657 may be adjusted. Depending on how the combination of broadcast interval 657 and transmission power setting 659 are combined, the combination may help to increase the probability of a user device 625 connecting to a particular SSID or displaying the SSIDs in a desired order. For example, if wireless transceiver 653 is originally set to the configuration as seen in FIG. 6*b*, and then a user modifies the transmission characteristics so the broadcast interval 657 and transmission power setting 659 are as follows: SSID 1@50 ms and 80, SSID 2@50 ms and 95, SSID 3@160 ms and 20, and SSID 4@200 ms and 15, then it may increase the probability of SSID 2 being transmitted at the highest priority, and user device 625 may display it to the user with the highest priority. In some aspects, it may also increase the probability of the user device connecting to the desired SSID (e.g., SSID 2).

Figure 7A:
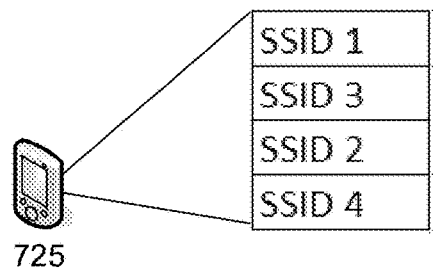
FIGS. 7a and 7b illustrate example information in accordance with aspects of the present disclosure.

FIG. 7*a* illustrates a table 701 of transmission characteristics for controlling or operating a wireless transceiver 703. In this example, wireless transceiver 703 may broadcast and/or transmit one or more wireless networks identified by unique network SSIDs 705 (e.g., SSID 1, SSID 2, SSID 3, and SSID 4). In this example embodiment, each wireless network may be broadcast and/or transmitted at a different broadcast interval 707 dependent on the congestion level 709. For example, table 701 may represent broadcast interval 707 characteristics and congestion level 709 characteristics of the network SSIDs at a first point in time.

Figure 7B:
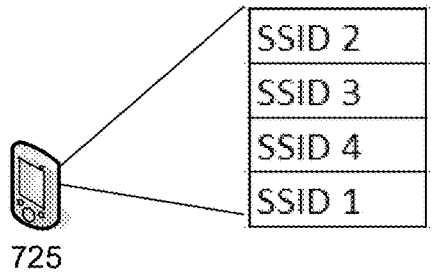

FIG. 7*b* illustrates table 701 at a second point time. As seen in FIG. 7*a*, mobile device 725 may originally display the priority of the SSIDs 705 as SSID 1 (highest), SSID 3, SSID 2, and SSID 4 (lowest). However, at the second point in time (e.g., after the wireless transceiver 703 may have been adjusted), as seen in FIG. 7*b*, the mobile device 725 may display the priority of the SSIDs 705 as SSID 2, SSID 3, SSID 4, and SSID 1. Under this example, the preference for broadcasting and/or transmitting certain SSIDs at a higher priority than other SSIDs may be based on variation in congestion level.

In some embodiments, the mobile device 725 or the entity controlling the wireless transceiver 703 may be able to adjust or determine how the broadcast interval 707 may be adjusted for each network SSID 705 dependent on the congestion level 709. In some examples, the content or service provider may configure a predetermined set of transmission characteristics for how the broadcast interval 707 may be adjusted for each network SSID 705 dependent on the congestion level 709. For example, when the congestion level 709 is high on a particular SSID 705, the transmission characteristics may be changed to decrease the broadcast interval 707 in order to re-prioritize the SSIDs 705. This may allow another SSID 705, with a lower congestion level 709, to have a greater chance of being displayed and/or connected to by the mobile device 725. In some aspects, any previously described methods of altering the broadcast interval 707 of an SSID may be applied based on the congestion level 709.

In some embodiments, the congestion level 709 may be represented by a number value. In other embodiments, the congestion level 709 may be represented by a range or qualitative value. For example, the congestion level 709 as shown in FIG. 7*a* is characterized as high, low, medium, medium-high, and the like. In some aspects, the congestion level 709 may be a measurement of bandwidth being utilized by the user device 725. In some instances, the congestion level 709 may be measured by how many user devices 725 are connected to a particular SSID. Different characteristics other than congestion level 709 may be used in place of the congestion level 709, such as time (e.g., time of day, month, weekday, weekend, etc.), public wireless access, private wireless access, free wireless access, paid wireless access, any other characteristics associated with a particular SSID. The illustrated transmission characteristics should not be interpreted as having any dependency or requirement relating to any one or combination of broadcast characteristics.

Figure 8:
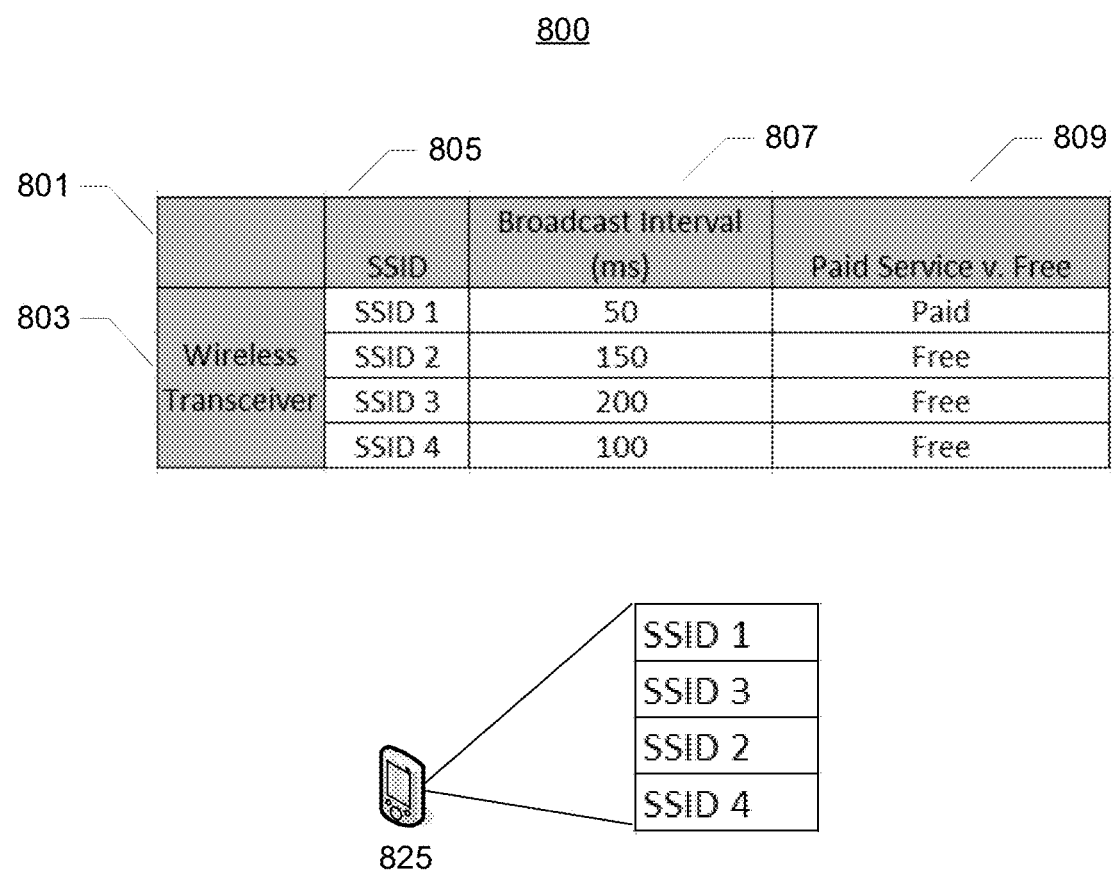
FIG. 8 illustrates example information in accordance with aspects of the present disclosure.

FIG. 8 illustrates a table 801 of transmission characteristics for controlling or operating a wireless transceiver 803. In this example, wireless transceiver 803 may broadcast and/or transmit one or more network-associated identifiers, such as SSIDs 805 (e.g., SSID 1, SSID 2, SSID 3, and SSID 4). Each SSID 805 may be broadcast and/or transmitted at a different broadcast interval 807 based on whether the SSID represents a free or a paid-for wireless network. In some embodiments, free wireless networks may correlate to public wireless networks or private wireless networks. In other embodiments, paid for wireless networks may correlate to public wireless networks or private wireless networks. In some embodiments (not shown), each SSID 805 may be broadcast and/or transmitted at a different transmission power setting based on whether the wireless network is a free or a paid-for wireless network.

Figure 9:
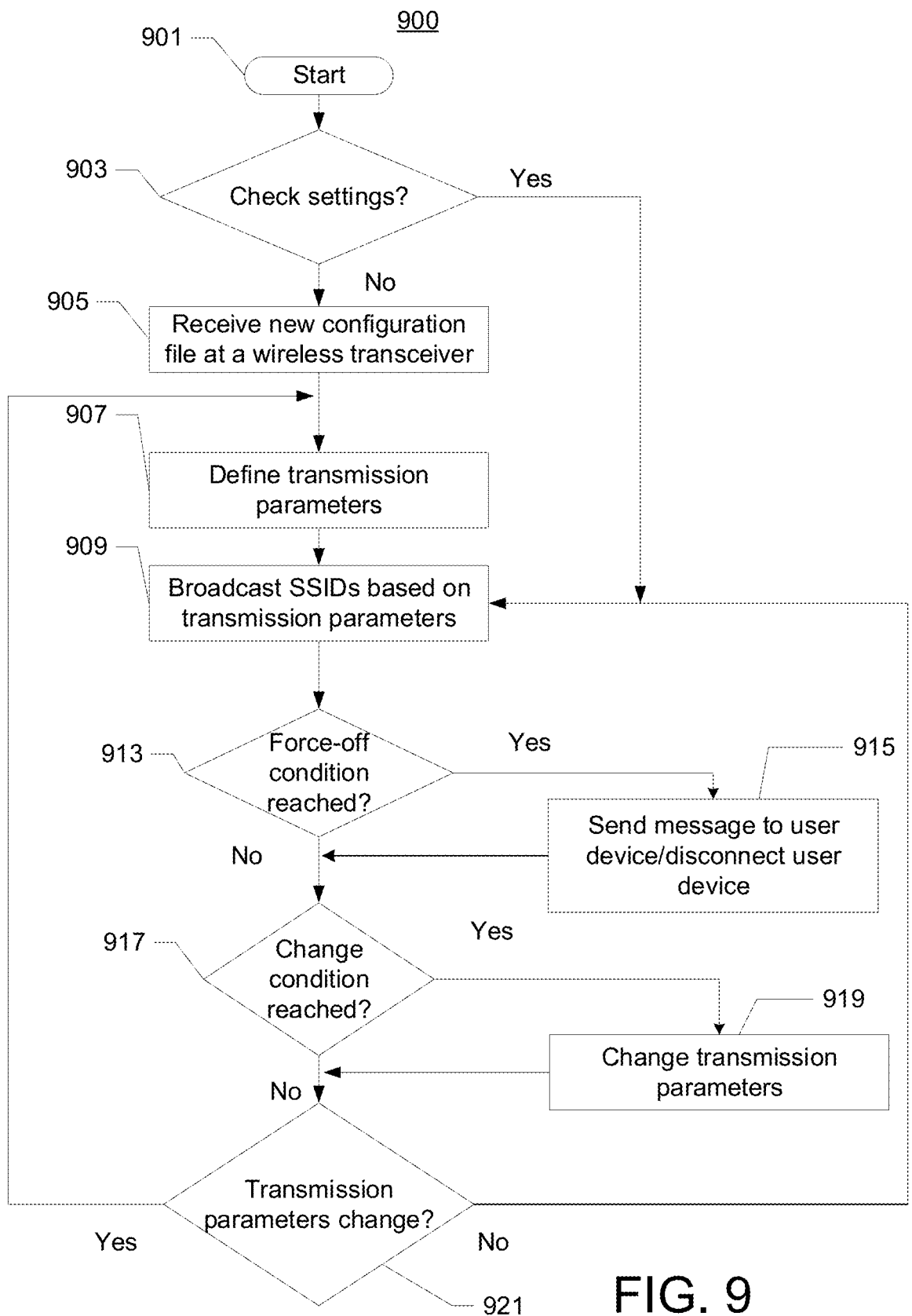
FIG. 9 illustrates a flowchart of an example process in accordance with aspects of the present disclosure.

FIG. 9 illustrates an example process flow 900 for configuring a computing device such as a wireless transceiver (e.g. wireless router, wireless access point, and the like), or a controller therefor, and processing the parameters for controlling how network-associated identifiers are broadcast and/or transmitted from the router. The method begins at step 901.

A service or content provider may provide a wireless transceiver the ability to enable data transmissions over one or more networks, and to transmit, e.g., broadcast, one or more identifiers such as SSIDs associated with the one or more networks. In some implementations, a provider location 103 shown in FIG. 1 may administer configuration and management of one or more wireless networks via a wireless transceiver. In some embodiments, network 109 shown in FIG. 1 may configure one or more wireless networks via an interface device 111. In another example, a router may configure one or more SSIDs maintained by local office 103 shown in FIG. 1. A wireless transceiver, interface device, wireless access point, router, and the like may be used interchangeably or as an alternative for each other.

In step 903, the wireless transceiver may determine a configuration for transmitting one or more SSIDs, such as whether to use an initial or existing configuration file, or using a different such as an updated configuration file. If the wireless transceiver determines to use the initial configuration file (e.g., initial setting) to broadcast the one or more SSIDs, then the method may proceed to step 909. If the wireless transceiver receives a different configuration file (e.g., user input or instruction from a head-end) for broadcasting and/or transmitting the one or more SSIDs, then the method may proceed to step 905. The decision whether to change configuration (e.g. use a different configuration file) may be made dependent on the time of day, congestion, etc.

In step 905, the wireless transceiver may receive a new configuration file. In some embodiments, the new configuration file may be generated and transmitted by a user device. In some aspects, the new configuration file may be generated by the user, client, or service provider and transmitted via network 109 or a head-end device.

In step 907, the parameters for operating the wireless transceiver and controlling the transmission parameters may be determined. In some aspects, defining the transmission parameters may be determined from analyzing, downloading, and/or enabling the new configuration file.

In step 909, the one or more network identifiers or SSIDs that may be broadcast and/or transmitted by the wireless transceiver may be configured to be broadcast and/or transmitted based on the transmission parameters. Under this step, one or more user devices may connect to the one or more SSIDs being broadcast and/or transmitted by the wireless transceiver. In some examples, the one or more user devices may connect to a particular SSID of the one or more SSIDs being broadcast and/or transmitted by the wireless transceiver. The transceiver may be able to track and monitor which particular SSID each of the one or more devices may be connected to.

In step 913, the method may determine if a force off condition is reached. In some embodiments, a force off condition may be utilized to force a user device to a particular SSID. For example, a user device may pay for additional service located on another SSID, but originally connected to a different SSID. Under this example, the user device would be forced off the SSID it is currently connected to in order to give it a better chance to connect to the SSID with the paid-for service. In some variations, a force off condition may be utilized to force off a user device from a particular SSID, because the user device does not have the proper credentials to have access to that SSID. In some examples, a force off condition may be utilized to force off a user device from a particular SSID due to congestion of that particular SSID. If the force off condition is reached, then the method proceeds to step 915. If the force off condition has not been reached, then the method may proceed to step 917.

In step 915, the user device may be disconnected from a particular SSID. In some embodiments, before the user device is forced off a particular SSID, there may be a message sent to the user device that may contain information about why the device will be forced off the particular SSID. For example, a message may be sent to the user device stating that the user device may be forced off due to the device being connected to a SSID representing a public SSID, when the user device may be available to be connected to a SSID representing a private SSID.

In step 917, the wireless transceiver may determine if a change condition has been met. For example, if a particular SSID reaches a certain congestion level, then the transmission parameters may be changed. In another example, if a certain time of day is reached, e.g. afternoon or night, then the change condition may be met, and the wireless transceiver may need to be adjusted. If a change condition is reached, then the method may proceed to step 919. If no change condition is reached, then the method may proceed to step 921.

In step 919, the SSID transmission parameters may change. For example, if the change condition is met, SSID 1 may be broadcast and/or transmitted less frequently, and SSID 2 may be broadcast and/or transmitted more frequently.

In step 921, the wireless transceiver may determine if there was a transmission parameter change or if a transmission parameter change was received. In some embodiments, a transmission parameter change may be transmitted by the user or client to the wireless transceiver which may modify the transmission parameters of the SSIDs. In other embodiments, a transmission parameter change may be transmitted by the content or service provider. If the transmission parameter change occurs, then the method may proceed to step 907. If no transmission parameter change occurs, then the method may proceed to step 909.

Figure 10:
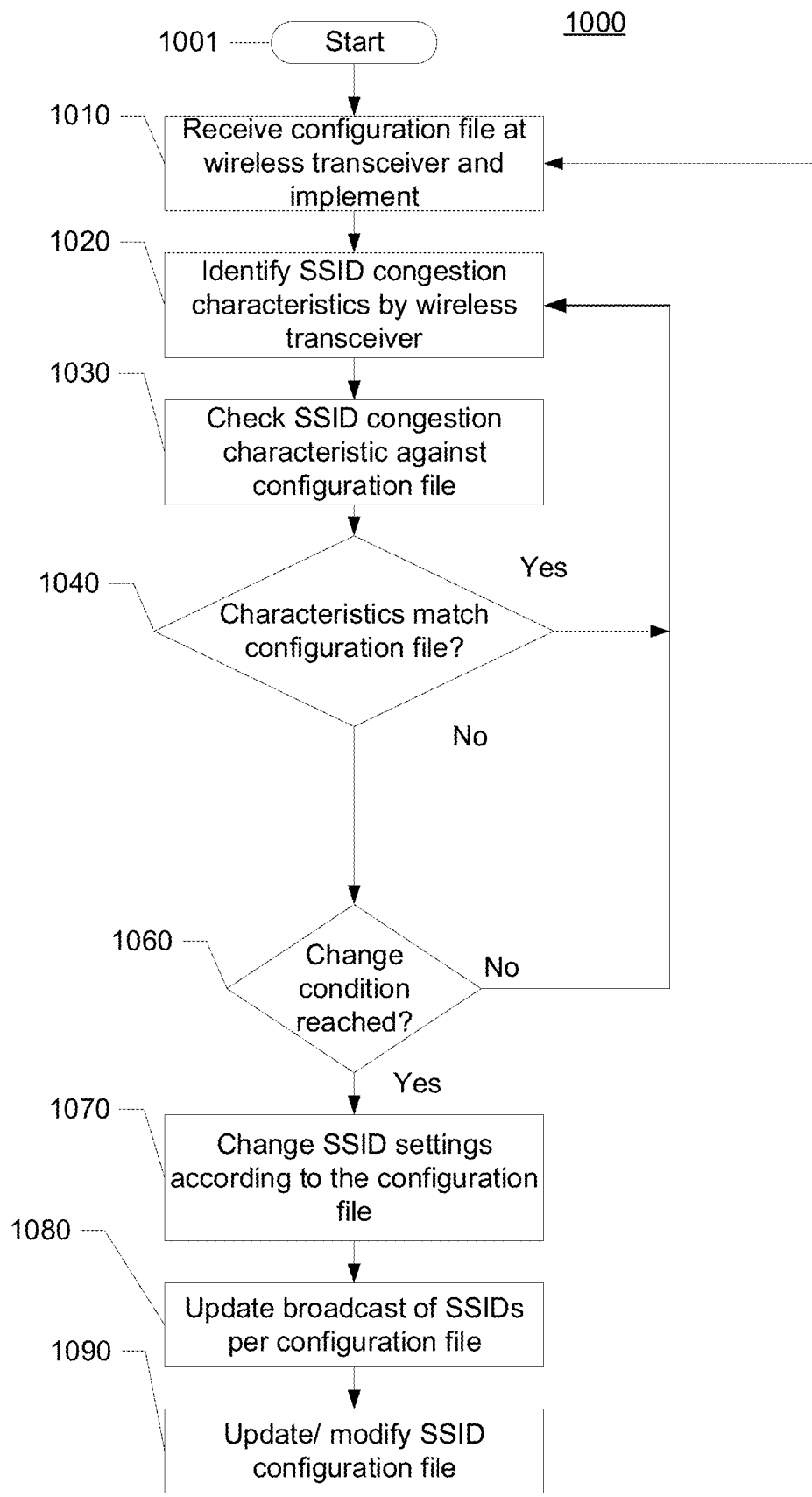
FIG. 10 illustrates a flowchart of an example process in accordance with aspects of the present disclosure.

FIG. 10 illustrates an example process flow 1000, which in some aspects may be implemented together with embodiments discussed in FIGS. 7a and 7b. The method begins at step 1001.

At step 1010, a computing device such as a wireless transceiver 703 may receive a configuration file that may contain transmission parameters for one or more network-associated identifiers, for example, SSIDs 705. The configuration file may enable the wireless transceiver 703 to broadcast and/or transmit the SSIDs with a particular priority. Once the wireless transceiver 703 has downloaded or received the configuration file, the wireless transceiver 703 may use the configuration to broadcast and/or transmit each SSID (e.g., SSID 1-SSID 4) of the SSIDs 705 at a particular broadcast interval 707.

At step 1020, the wireless transceiver 703 may check, monitor, and/or identify the congestion level 709 of each individual SSID.

At step 1030, the wireless transceiver 703 may check the SSID congestion characteristics against the configuration file. In some embodiments, the wireless transceiver 703, the head-end device, or the user device 725 may check the congestion characteristics against the configuration file.

At step 1040, a determination may be made by the wireless transceiver 703, the head-end device, or the user device 725 whether the congestion characteristics match the transmission parameters of the configuration file. If the congestion characteristics match the transmission parameters of the configuration file, then the method may return to step 1020. If the congestion characteristics do not match the transmission parameters of the configuration file, then the method may proceed to step 1050.

At step 1060, the wireless transceiver 703, head-end device, or the user device 725 may determine whether a change condition has been met based on the transmission parameters located in the configuration file. If no change condition has been reached, then the method may return to step 1020. If a change condition has been reached, then the method may proceed to step 1070. For example, a change condition may be that a particular SSID's congestion level reaches or exceeds a certain threshold.

At step 1070, the wireless transceiver 703 may change the broadcast interval or other transmission characteristics according to the configuration file. In some aspects, the head-end and/or user device 725 may transmit instructions (e.g., a new configuration file) to the wireless transceiver 703 causing the wireless transceiver 703 to adjust the broadcast interval according to the transmission characteristics located in the new configuration file.

At step 1080, the wireless transceiver 703 may broadcast and/or transmit the SSIDs 705 according to the new configuration file.

At step 1090, the wireless transceiver 703, the head-end device, and/or the user device 725 may update or modify the SSID transmission parameters to detail when the SSIDs 705 should be broadcast and/or transmitted differently based on congestion level 709.

Figure 11:
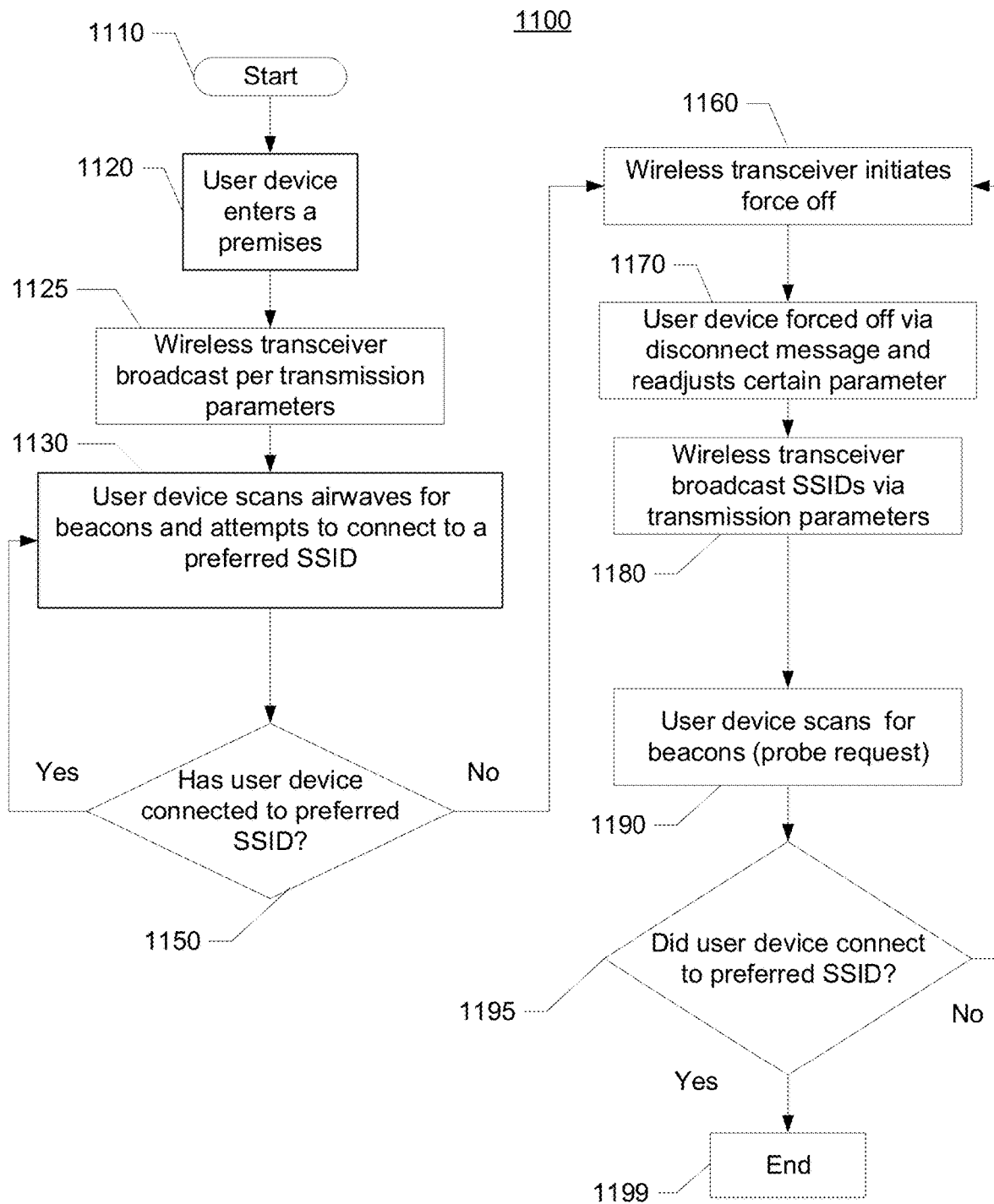
FIG. 11 illustrates a flowchart of an example process in accordance with aspects of the present disclosure.

FIG. 11 illustrates example process flow 1100 for configuring a computing device such as a wireless transceiver and processing the transmission parameters for controlling how a user device may be forced off an undesired network-associated identifier, such as an SSID.

The method begins at step 1110. At step 1120, a user may enter a premises (e.g., 102 or 301) with a user device. The user device may have previously been associated to a particular SSID at another premises (e.g., a neighbor's house, train station, etc.). In some aspects, a desired user experience may be to ensure that the user device connects to a preferred SSID (e.g., a paid for service that may have a higher bandwidth capacity, access to local networks, downloadable content exclusive to the user, other home user-centric features, etc.).

At step 1125, a wireless transceiver may broadcast and/or transmit a plurality of SSIDs according to configured transmission parameters, as previously discussed.

At step 1130, the user device may scan the airwaves searching for network identifiers in order to associate with a preferred SSID. In some examples, the user device may not connect to the preferred SSID and may instead connect to an undesired SSID.

At step 1150, the wireless transceiver, a head-end device, and/or the user device may determine if the user device has connected to a preferred SSID. The wireless transceiver, head-end device, or user device may determine whether the user device has connected to the preferred SSID by analyzing the transmission parameters of a configuration file. If it is determined that the user device has connected to the preferred SSID, the method may proceed to step 1130. If it is determined that the user device has not connected to the preferred SSID, then the method may proceed to step 1160.

At step 1160, the wireless transceiver may initiate a force off condition to force the user device off the SSID. For example the computing device may initiate a communication comprising one or more packets to the wireless device. The wireless transceiver may transmit a first packet via the SSID that the user device is connected to (e.g., the undesired SSID), which may trigger an identity verification and authorization sequence. After the user device receives and implements the identity verification and authorization sequence, the wireless transceiver may send a change of authorization packet to the user device to force the user device to disassociate from the undesired SSID. In some instances, a change packet (change authorization) may be initiated from the computing device to the wireless transceiver to force the user device to disassociate from the undesired SSID. In some examples, the computing device may perform a packet identity verification by analyzing the first packet transmitted and/or received by the wireless transceiver via the computing device. The computing device may use a form or process of an authorization sequence to determine which SSID the first packet is correlated with of the plurality of SSIDs. The computing device may then proceed to disassociate the user device from the SSID related to the first packet, if the first packet is not identified as the preferred SSID. In some aspects, the force off condition may terminate the transmission (broadcasting and/or transmitting) of the undesired SSID (e.g., the SSID the user device is currently connected to).

In some variations, the wireless transceiver may temporarily discontinue transmission of the undesired SSID and, upon detecting that the device has connected to a different SSID, resume transmitting or broadcasting the undesired SSID.

At step 1170, in response to the user device receiving and implementing the change of authorization packet, the user device may disassociate from an undesired SSID. The change of authorization packet may also adjust other transmission parameters of the SSIDs via modifying an existing configuration file or generating new configuration file. For example, a new configuration file may include transmission parameters that may increase the broadcast interval of the preferred SSID, and decrease the broadcast interval of the undesired SSID. In some aspects, the transmission parameters for broadcasting the SSIDs may be any of the methods previously described.

At step 1180, the wireless transceiver may broadcast and/or transmit the SSIDs based on a modified configuration file or a new configuration file.

At step 1190, the user device may scan the airwaves for beacons and may attempt to connect to the preferred SSID.

At step 1195, the wireless transceiver, head-end device, or user device may determine whether the user device connected to the preferred SSID. In some embodiments, the wireless transceiver, head-end device, or user device may receive an acknowledgment identifying which SSID the user device may be connected to. If it is determined that the user device has connected to the preferred SSID, then the method may proceed to step 1199 and end. If it is determined that the user device has not connected to the preferred SSID, then the method may proceed to step 1160.

As with the methods of FIGS. 9, 10, and 11 steps may be added, omitted, modified, and/or reorder. Also, as with the methods of FIGS. 9, 10, and 11 broadcast interval adjustments may be interchanged with transmission power setting adjustments, in order to modify the way a wireless transceiver broadcast or transmits SSIDs.

The various features described herein are merely non-limiting examples and may be rearranged, combined, subdivided, omitted, and/or altered in any desired manner. For example, features of the interface device may be subdivided among multiple processors and computing devices. The scope of this patent should be defined only by the claims that follow.

The invention claimed is:

1. A method implemented by one or more computing devices, comprising:
processing, by the one or more computing devices, a configuration file, wherein the configuration file comprises transmission parameters for transmitting a plurality of network identifiers and identifying a preferred network identifier for a user device;
transmitting, by the one or more computing devices, the plurality of network identifiers based on the configuration file;
receiving, by the one or more computing devices, an acknowledgment indicating that the user device has connected to a particular network identifier of the plurality of network identifiers;
determining, by the one or more computing devices, that the particular network identifier is a non-preferred network identifier; and
causing, by the one or more computing devices and based on the determining, the one or more computing devices to stop transmitting the particular network identifier.

2. The method of claim 1, further comprising:
receiving, by the one or more computing devices, an additional acknowledgment indicating that the user device has connected to a new particular network identifier; and
determining, by the one or more computing devices, whether the new particular network identifier is the preferred network identifier.

3. The method of claim 1, further comprising:
adjusting, by the one or more computing devices, the configuration file to create a new configuration file; and
transmitting, by the one or more computing devices and based on the adjusting, the plurality of network identifiers based on the new configuration file,
wherein the new configuration file contains adjusted transmission parameters to transmit the preferred network identifier at a higher priority.

4. The method of claim 3, where transmitting the preferred network identifier at a higher priority comprises one or more of:
increasing a rate at which to transmit beacon frames of the preferred network identifier, or
increasing an antenna transmit power at which to transmit the beacon frames of the preferred network identifier.

5. The method of claim 1, wherein the transmission parameters comprise instructions for a rate at which to transmit beacon frames of each network identifier of the plurality of network identifiers being transmitted.

6. The method of claim 1, wherein the one or more computing devices consists of one wireless router.

7. An apparatus comprising:
one or more processors; and
memory storing computer-readable instructions that, when executed by the one or more processors, cause the apparatus to:
process a configuration file, wherein the configuration file comprises transmission parameters for transmitting a plurality of network identifiers and identifying a preferred network identifier for a user device;
transmit the plurality of network identifiers based on the configuration file;
receive an acknowledgment indicating that the user device has connected to a particular network identifier of the plurality of network identifiers;
determine that the particular network identifier is a non-preferred network identifier; and
cause, based on the determining, stopping transmitting the particular network identifier.

8. The apparatus of claim 7, wherein the instructions, when executed by the one or more processors, further cause the apparatus to:
receive an additional acknowledgment indicating that the user device has connected to a new particular network identifier; and
determine whether the new particular network identifier is the preferred network identifier.

9. The apparatus of claim 7, wherein the instructions, when executed by the one or more processors, further cause the apparatus to:
adjust the configuration file to create a new configuration file; and
transmit based on the adjusting, the plurality of network identifiers based on the new configuration file,
wherein the new configuration file contains adjusted transmission parameters to transmit the preferred network identifier at a higher priority.

10. The apparatus of claim 9, wherein the instructions, when executed by the one or more processors, further cause the apparatus to transmit the preferred network identifier at a higher priority by:
increasing a rate at which to transmit beacon frames of the preferred network identifier, or
increasing an antenna transmit power at which to transmit the beacon frames of the preferred network identifier.

11. The apparatus of claim 7, wherein the transmission parameters comprise instructions for a rate at which to transmit beacon frames of each network identifier of the plurality of network identifiers being transmitted.

12. One or more non-transitory computer-readable media storing instructions that, when executed, cause:
processing, by one or more computing devices, a configuration file, wherein the configuration file comprises transmission parameters for transmitting a plurality of network identifiers and identifying a preferred network identifier for a user device;

transmitting, by the one or more computing devices, the plurality of network identifiers based on the configuration file;

receiving, by the one or more computing devices, an acknowledgment indicating that the user device has connected to a particular network identifier of the plurality of network identifiers;

determining, by the one or more computing devices, that the particular network identifier is a non-preferred network identifier; and causing, by the one or more computing devices and based on the determining, the one or more computing devices to stop transmitting the particular network identifier.

13. The one or more non-transitory computer-readable media of claim 12, wherein the instructions, when executed, further cause:

receiving, by the one or more computing devices, an additional acknowledgment indicating that the user device has connected to a new particular network identifier; and determining, by the one or more computing devices, whether the new particular network identifier is the preferred network identifier.

14. The one or more non-transitory computer-readable media of claim 12, wherein the instructions, when executed, further cause:

adjusting, by the one or more computing devices, the configuration file to create a new configuration file; and transmitting, by the one or more computing devices and based on the adjusting, the plurality of network identifiers based on the new configuration file, wherein the new configuration file contains adjusted transmission parameters to transmit the preferred network identifier at a higher priority.

15. The one or more non-transitory computer-readable media of claim 14, wherein the instructions, when executed, cause the transmitting the preferred network identifier at a higher priority by:

increasing a rate at which to transmit beacon frames of the preferred network identifier, or increasing an antenna transmit power at which to transmit the beacon frames of the preferred network identifier.

16. The one or more non-transitory computer-readable media of claim 12, wherein the transmission parameters comprise instructions for a rate at which to transmit beacon frames of each network identifier of the plurality of network identifiers being transmitted.

17. The one or more non-transitory computer-readable media of claim 12, wherein the one or more computing devices consists of one wireless router.

* * * * *